United States Patent
Eng et al.

(10) Patent No.: US 10,567,971 B2
(45) Date of Patent: Feb. 18, 2020

(54) BROADCAST/BROADBAND CONVERGENCE NETWORK

(71) Applicant: Coherent Logix, Incorporated, Austin, TX (US)

(72) Inventors: Tommy K. Eng, Pleasanton, CA (US); Kevin A. Shelby, Austin, TX (US)

(73) Assignee: COHERENT LOGIX, INCORPORATED, Austin, TX (US)

( * ) Notice: Subject to any disclaimer, the term of this patent is extended or adjusted under 35 U.S.C. 154(b) by 209 days.

(21) Appl. No.: 14/456,817

(22) Filed: Aug. 11, 2014

(65) Prior Publication Data

US 2015/0043491 A1 Feb. 12, 2015

Related U.S. Application Data

(60) Provisional application No. 61/864,631, filed on Aug. 11, 2013, provisional application No. 61/864,976, filed on Aug. 12, 2013.

(51) Int. Cl.
*H04W 16/14* (2009.01)
*H04W 4/06* (2009.01)
(Continued)

(52) U.S. Cl.
CPC .......... *H04W 16/14* (2013.01); *H04H 20/423* (2013.01); *H04W 4/06* (2013.01); *H04L 5/001* (2013.01)

(58) Field of Classification Search
CPC ...... H04W 16/14; H04W 4/06; H04H 20/423; H04L 5/001
See application file for complete search history.

(56) References Cited

U.S. PATENT DOCUMENTS 9,872,123 B2* 1/2018 Webb .................. H04W 4/70
2008/0298477 A1* 12/2008 Classon ............... H04L 5/0007
375/260

(Continued)

FOREIGN PATENT DOCUMENTS

WO WO 2011/047357 4/2011
WO WO 2011/140462 A2 11/2011
(Continued)

OTHER PUBLICATIONS

Telesystem Innovations Inc., LTE in a Nutshell: The Physical Layer, 2010, https://home.zhaw.ch/kunr/NTM1/literatur/LTE%20in%20a%20Nutshell%20-%20Physical%20Layer.pdf.*

(Continued)

*Primary Examiner* — Ajit Patel
*Assistant Examiner* — Richard Schnell
(74) *Attorney, Agent, or Firm* — Kowert Hood Munyon Rankin and Goetzel PC; Jeffrey C. Hood

(57) ABSTRACT

A broadcast/broadband convergence system that delivers content from content sources to user equipment devices. The system provides: significantly enhanced mobile capability to the broadcast industry; an additional revenue source for the broadcast industry by dynamically selling available spectral resources for use by wireless broadband networks and/or broadcast content off-loaded from wireless broadband networks; additional spectrum for the broadband industry through the dynamic purchase of available spectrum; and an enriched user experience. A spectrum server may facilitate the dynamic allocation of radio spectrum made available by the broadcast networks. The broadcast networks may broadcast with enhanced waveform parameters to support mobile devices as well as fixed devices.

19 Claims, 25 Drawing Sheets

(51) Int. Cl.
*H04H 20/42* (2008.01)
*H04L 5/00* (2006.01)

(56) References Cited

U.S. PATENT DOCUMENTS

| | | | | |
|---|---|---|---|---|
| 2010/0040009 A1* | 2/2010 | Gaal | ............... | H04W 28/26 370/329 |
| 2012/0039293 A1* | 2/2012 | Feng | ............... | H04L 5/001 370/329 |
| 2012/0063373 A1* | 3/2012 | Chincholi | ............... | H04L 5/001 370/281 |
| 2012/0094681 A1* | 4/2012 | Freda | ............... | H04W 72/02 455/452.1 |
| 2012/0281565 A1 | 11/2012 | Sauer | | |
| 2012/0314630 A1 | 12/2012 | Walker et al. | | |
| 2013/0003664 A1* | 1/2013 | Frenne | ............... | H04W 72/1289 370/329 |
| 2013/0311669 A1* | 11/2013 | Reimers | ............... | H04H 20/42 709/231 |
| 2014/0038655 A1* | 2/2014 | Garnett | ............... | H04W 16/14 455/509 |
| 2015/0017999 A1* | 1/2015 | Chen | ............... | H04W 16/14 455/452.1 |

FOREIGN PATENT DOCUMENTS

| | | | | |
|---|---|---|---|---|
| WO | WO 2012/097923 | | 7/2012 | |
| WO | WO 2014175788 A1 * | | 10/2014 | ............ H04W 28/06 |
| WO | 2010121417 A1 | | 10/2018 | |

OTHER PUBLICATIONS

Simon, Mike et al. "Exploring Innovative Opportunities in ATSC Broadcasting: Convergence in the UHF Bank in USA," ATSC Symposium on Next Generation Broadcast Television, Feb. 15, 2011, Rancho Mirage, California (34 pages).

Aitken, Mark A., "Broadcase Convergence—Bringing Efficiency to a New Platform," Society of Motion Picture and Television Engineers (SMPTE) 2011 Annual Conference, Oct. 25-27, 2011, Hollywood, California (13 pages).

Aitken, Mark A., "Broadcast—The Technology and the Medium," Sinclair Broadcast Group, 61st Annual IEEE Broadcast Symposium, Alexandria, Virginia, Oct. 19-21, 2011 (21 pages).

3GPP, "Layer 1 for Interfaces Supporting Multimedia Broadcast Multicast Service (MBMS) with E-UTRAN (Release 11)," Technical Specification (TS 36.441) V11.0.0, Sep. 2012, 3rd Generation Partnership Project (3GPP), Valbonne, France (6 pages).

Roessler, Andreas, et al. "Carrier Aggregation—(One) Key Enabler for LTE-Advanced," Rohde & Schwarz Technical Article, V.01.01, Oct. 2012 (12 pages).

Notice of the Reason for Refusal, Patent Application No. 2016-534778, dated Sep. 11, 2018, 2 pages.

Office Action from China National Intellectual Property Administration dated Apr. 16, 2019 in related Chinese Application No. 201480052002.3.

* cited by examiner

| Parameters | | | | Enhanced: Variable CP | | | | | |
|---|---|---|---|---|---|---|---|---|---|
| Fs (MHz) | 7.68 | 7.68 | 7.68 | 7.68 | 7.68 | 7.68 | 7.68 | 7.68 | 7.68 |
| NFFT | 512 | 768 | 768 | 1024 | 1024 | 1536 | 1536 | 1536 | 2048 |
| Δf (kHz) | 15 | 10 | 10 | 7.5 | 7.5 | 5 | 5 | 5 | 3.75 |
| TFFT (μs) | 66.67 | 100 | 100 | 133.3 | 133.3 | 200 | 200 | 200 | 266.67 |
| CP % | 25 | 4.167 | 25 | 25 | 17.188 | 4.167 | 11.111 | 25 | 17.188 |
| GI (μs) | 16.67 | 4.167 | 25 | 33.33 | 22.92 | 8.33 | 22.22 | 50 | 45.83 |
| TSYM (μs) | 83.33 | 104.167 | 125 | 166.67 | 156.25 | 208.33 | 222.22 | 250 | 312.5 |
| SYM / SF | 12 | 9.6 | 8 | 6 | 6.4 | 4.8 | 4.5 | 4 | 3.2 |
| SYM / Frame | 120 | 96 | 80 | 60 | 64 | 48 | 45 | 40 | 32 |
| Modulus | DIV 6, 8 | DIV 6, 8 | DIV 8 | DIV 6 | DIV 8 | DIV 6, 8 | | DIV 8 | DIV 8 |

FIG. 3 (Table 1)

| Parameters | | | | Variable CP | | | | | |
|---|---|---|---|---|---|---|---|---|---|
| Fs (MHz) | 7.68 | 7.68 | 7.68 | 7.68 | 7.68 | 7.68 | 7.68 | 7.68 | 7.68 |
| NFFT | 2048 | 3072 | 3072 | 4096 | 6144 | 6144 | 8192 | 12288 | 16384 |
| Δf (kHz) | 3.75 | 2.5 | 2.5 | 1.875 | 1.25 | 1.25 | 0.9375 | 0.625 | 0.46875 |
| TFFT (μs) | 266.67 | 400 | 400 | 533.33 | 800 | 800 | 1066.67 | 1600 | 2133.33 |
| CP % | 25 | 4.167 | 25 | 25 | 4.167 | 25 | 17.188 | 4.167 | 17.188 |
| GI (μs) | 66.67 | 16.67 | 100 | 133.33 | 33.33 | 200 | 183.33 | 66.67 | 366.67 |
| TSYM (μs) | 333.33 | 416.67 | 500 | 666.67 | 833.33 | 1000 | 1250 | 1666.67 | 2500 |
| SYM / SF | 3 | 2.4 | 2 | 1.5 | 1.2 | 1 | 0.8 | 0.6 | 0.4 |
| SYM / Frame | 30 | 24 | 20 | 15 | 12 | 10 | 8 | 6 | 4 |
| Modulus | | DIV 6, 8 | | | DIV 6 | | DIV 8 | DIV 6 | |

*FIG. 4 (Table 2)*

| RF Config | eMBMS | Enhanced | Units |
|---|---|---|---|
| dlCyclicPrefixType [Enh 3] | 0: CP_NORMAL (disallowed in eMBMs), 1: CP_EXTENDED | {1, 2, 3, 4} → 25%, 17%, 11%, 4% | unum |
| ulCyclicPrefixType [Enh 3] | 0: CP_NORMAL (disallowed in eMBMs), 1: CP_EXTENDED | {1, 2, 3, 4} → 25%, 17%, 11%, 4% | unum |
| dlChannelBW | {6, 15, 25, 50, 75, 100}: 1.4, 3, 5, 10, 15, 20 MHz | eMBMS + {32, 38, 44} → 6, 7, 8 MHz | #RBs |
| ulChannelBW | {6, 15, 25, 50, 75, 100}: 1.4, 3, 5, 10, 15, 20 MHz | eMBMS + {32, 38, 44} → 6, 7, 8 MHz | #RBs |
| Subcarrier spacing [Enh 4] | {0, 1}: 15, 7.5 kHz | eMBMS + {2:N-1} → 10, 5, 3.75, ..., 0.46875 | unum |
| refSignalPower | 0:255 → 0:-0.25:-63.75 dBm | No change | unum |
| rxAntennaPort | 1, 2, 4 | No change | #Ant |
| rxAntennaPort | 1, 2, 4 | No change | #Ant |

FIG. 5 (Table 3)

| N_mbrs | 6 | | | | | | | |
|---|---|---|---|---|---|---|---|---|
| | | | | Carrying Capacity | | | | |
| System BW | 6 | 6 | 6 | 6 | 6 | 6 | 6 | MHz |
| Sampling Rate | 7.68 | 7.68 | 7.68 | 7.68 | 7.68 | 7.68 | 7.68 | MS/s |
| Occupied Bandwidth | 5.76 | 5.76 | 5.76 | 5.76 | 5.76 | 5.76 | 5.76 | MHz |
| Subcarrier Scale Factor | 1 | 1.5 | 1.5 | 2 | 3 | 3 | 4 | |
| FFT Size | 512 | 768 | 768 | 1024 | 1536 | 1536 | 2048 | |
| Number of RBs | 32 | 48 | 48 | 64 | 96 | 96 | 128 | |
| Occupied Subcarriers | 384 | 576 | 576 | 768 | 1152 | 1152 | 1536 | |
| Subcarriers per RB | 12 | 18 | 18 | 24 | 36 | 36 | 48 | |
| Resource Blocks/slot | 32 | 32 | 32 | 32 | 32 | 32 | 32 | |
| Subcarrier Spacing | 15 | 10 | 10 | 7.5 | 5 | 5 | 3.75 | kHz |
| Resource Block BW | 180 | 180 | 180 | 180 | 180 | 180 | 180 | kHz |
| Useful Period ($T_{FFT}$) | 66.67 | 100.00 | 100.00 | 133.33 | 200.00 | 200.00 | 266.67 | μs |
| CP Duration | 25% | 4% | 25% | 25% | 4% | 11% | 17% | |
| $T_{GI}$ (delay spread tol.) | 16.67 | 4.17 | 25.00 | 33.33 | 8.33 | 22.22 | 45.83 | μs |
| $T_{SYM}$ | 83.33 | 104.17 | 125.00 | 166.67 | 208.33 | 222.22 | 312.50 | μs |
| Slot | 0.5 | 0.5 | 0.5 | 0.5 | 0.5 | 0.5 | 0.5 | ms |
| Subframe | 1 | 1 | 1 | 1 | 1 | 1 | 1 | ms |
| Frame | 10 | 10 | 10 | 10 | 10 | 10 | 10 | ms |
| Superframe | 40 | 40 | 40 | 40 | 40 | 40 | 40 | ms |
| Symbols per slot | 6 | 4.8 | 4 | 3 | 2.4 | 2.25 | 1.6 | |
| Symbols per subframe | 12 | 9.6 | 8 | 6 | 4.8 | 4.5 | 3.2 | |
| Symbols per frame | 120 | 96 | 80 | 60 | 48 | 45 | 32 | |
| DL Streams | 1 | | | | | | | |
| | | | | Peak (uncoded) Data Rate | | | | |
| MOD QPSK | 3.31 | 3.97 | 3.31 | 3.97 | 3.31 | 3.72 | 3.53 | Mb/s |
| MOD 16QAM | 6.62 | 7.95 | 6.62 | 7.95 | 6.62 | 7.45 | 7.06 | Mb/s |
| MOD 64QAM | 9.93 | 11.92 | 9.93 | 11.92 | 9.93 | 11.17 | 10.59 | Mb/s |
| MOD 256QAM | 13.24 | 15.89 | 13.24 | 15.89 | 13.24 | 14.90 | 14.12 | Mb/s |
| DL Streams | 2 | | | | | | | |
| | | | | Peak (uncoded) Data Rate | | | | |
| MOD QPSK | 6.62 | 7.95 | 6.62 | 7.95 | 6.62 | 7.45 | 7.06 | Mb/s |
| MOD 16QAM | 13.24 | 15.89 | 13.24 | 15.89 | 13.24 | 14.90 | 14.12 | Mb/s |
| MOD 64QAM | 19.85 | 23.84 | 19.85 | 23.84 | 19.85 | 22.34 | 21.18 | Mb/s |
| MOD 256QAM | 26.47 | 31.78 | 26.47 | 31.78 | 26.47 | 29.79 | 28.24 | Mb/s |

FIG. 8 (Table 4)

| $N_{mbrs}$ | 6 | | | | | | |
|---|---|---|---|---|---|---|---|
| System BW | 6 | 6 | 6 | 6 | 6 | 6 | MHz |
| Sampling Rate | 7.68 | 7.68 | 7.68 | 7.68 | 7.68 | 7.68 | MS/s |
| Occupied Bandwidth | 5.76 | 5.76 | 5.76 | 5.76 | 5.76 | 5.76 | MHz |
| Subcarrier Scale Factor | 4 | 6 | 8 | 12 | 16 | 24 | 48 |
| FFT Size | 2048 | 3072 | 4096 | 6144 | 8192 | 12288 | 24576 |
| Number of RBs | 128 | 192 | 256 | 384 | 512 | 768 | 1536 |
| Occupied Subcarriers | 1536 | 2304 | 3072 | 4608 | 6144 | 9216 | 18432 |
| Subcarriers per RB | 48 | 72 | 96 | 144 | 192 | 288 | 576 |
| Resource Blocks/slot | 32 | 32 | 32 | 32 | 32 | 32 | 32 |
| Subcarrier Spacing | 3.75 | 2.5 | 1.875 | 1.25 | 0.9375 | 0.625 | 0.3125 | kHz |
| Resource Block BW | 180 | 180 | 180 | 180 | 180 | 180 | 180 | kHz |
| Useful Period, $T_{FFT}$ | 66.67 | 400.00 | 533.33 | 800.00 | 1066.67 | 1600.00 | 3200.00 | μs |
| CP Duration | 25% | 4% | 25% | 4% | 17% | 4% | 4% |
| $T_{GI}$ (delay spread tol.) | 66.67 | 16.67 | 133.33 | 33.33 | 200.00 | 66.67 | 133.33 | μs |
| $T_{SYM}$ | 333.33 | 416.67 | 666.67 | 833.33 | 1000.00 | 1666.67 | 3333.33 | μs |
| Slot | 0.5 | 0.5 | 0.5 | 0.5 | 0.5 | 0.5 | 0.5 | ms |
| Subframe | 1 | 1 | 1 | 1 | 1 | 1 | 1 | ms |
| Frame | 10 | 10 | 10 | 10 | 10 | 10 | 10 | ms |
| Superframe | 40 | 40 | 40 | 40 | 40 | 40 | 40 | ms |
| Symbols per slot | 1.5 | 1.2 | 0.75 | 0.6 | 0.5 | 0.3 | 0.15 |
| Symbols per subframe | 3 | 2.4 | 1.5 | 1.2 | 1 | 0.6 | 0.4 |
| Symbols per frame | 30 | 24 | 15 | 12 | 10 | 6 | 3 |

| DL Streams | 1 | | | | | | | Peak (uncoded) Data Rate |
|---|---|---|---|---|---|---|---|---|
| MOD | QPSK | 3.31 | 3.97 | 3.31 | 3.97 | 3.53 | 3.53 | 3.53 | Mb/s |
| | 16QAM | 6.62 | 7.95 | 6.62 | 7.95 | 7.06 | 7.06 | 7.06 | Mb/s |
| | 64QAM | 9.93 | 11.92 | 9.93 | 11.92 | 10.59 | 10.59 | 10.59 | Mb/s |
| | 256QAM | 13.24 | 15.89 | 13.24 | 15.89 | 14.12 | 14.12 | 14.12 | Mb/s |

| DL Streams | 2 | | | | | | | Peak (uncoded) Data Rate |
|---|---|---|---|---|---|---|---|---|
| MOD | QPSK | 6.62 | 7.95 | 6.62 | 7.95 | 7.06 | 7.06 | 7.06 | Mb/s |
| | 16QAM | 13.24 | 15.89 | 13.24 | 15.89 | 14.12 | 14.12 | 14.12 | Mb/s |
| | 64QAM | 19.85 | 23.84 | 19.85 | 23.84 | 21.18 | 21.18 | 21.18 | Mb/s |
| | 256QAM | 26.47 | 31.78 | 26.47 | 31.78 | 28.24 | 28.24 | 28.24 | Mb/s |

FIG. 9 (Table 5)

Regulatory Domain: North America
Governing Bodies: FCC, IC, CRTC

| Band | Frequencies (MHz) | | Spacing | Channel Numbering | | | | | | | | | | | | | | | | No. CHs | Max. Binary |
|---|---|---|---|---|---|---|---|---|---|---|---|---|---|---|---|---|---|---|---|---|---|
| | Lower | Upper | | | | | | | | | | | | | | | | | | | |
| VHF (low) | 54 | 88 | 6 | 2 | 3 | 4 | 5 | 6 | | | | | | | | | | | | 5 | 101 |
| VHF (high) | 175 | 216 | 6 | 7 | 8 | 9 | 10 | 11 | 12 | 13 | | | | | | | | | | 7 | 111 |
| UHF | 470 | 500 | 6 | 14 | 15 | 16 | 17 | 18 | | | | | | | | | | | | 5 | 101 |
| UHF 500 MHz | 500 | 596 | 6 | 19 | 20 | 21 | 22 | 23 | 24 | 25 | 26 | 27 | 28 | 29 | 30 | 31 | 32 | 33 | 34 | 16 | 10000 |
| UHF 600 MHz | 596 | 698 | 6 | 35 | 36 | 37 | 38 | 39 | 40 | 41 | 42 | 43 | 44 | 45 | 46 | 47 | 48 | 49 | 50 51 | 17 | 10001 |
| UHF 700 MHz | 698 | 806 | 6 | 52 | 53 | 54 | 55 | 56 | 57 | 58 | 59 | 60 | 61 | 62 | 63 | 64 | 65 | 66 | 67 68 69 | 18 | 10010 |
| UHF 800 MHz | 806 | 890 | 6 | 70 | 71 | 72 | 73 | 74 | 75 | 76 | 77 | 78 | 79 | 80 | 81 | 82 | 83 | | | 14 | 1110 |
| Addressing | r_addr | 3 | bits | | | | | | | | | | | | | | | | | c_addr row+col total 7 bytes | 5 bits 1 byte |

FIG. 12 (Table 6)

| Bandwidth Class | Aggregation Transmission Bandwidth Configuration | Max. No. of CC | Aggregated Bandwidth Equivalent |
|---|---|---|---|
| A | $N_{RB,agg} \leq 100$ | 1 | Up to 20 MHz |
| B | $N_{RB,agg} \leq 100$ | 2 | Up to 20 MHz |
| C | $100 \leq N_{RB,agg} \leq 200$ | 2 | 20 to 40 MHz |
| D | $200 \leq N_{RB,agg} \leq [300]$ | | For Further Study |
| E | $[300] \leq N_{RB,agg} \leq [400]$ | | |
| F | $[400] \leq N_{RB,agg} \leq [500]$ | | |

FIG. 13 (Table 7)

```xml
<cellConfigParam>
    <cellParameters>
  <dlEARFCN>5230 </dlEARFCN>
        <!-- {1, 2, 4} -->
  <numOfAntennas>2 </numOfAntennas>
        <subcarrierSpacing>0 </subcarrierSpacing>
        <dlCyclicPrefix>0 </dlCyclicPrefix>
        <rbSize>0 </rbSize>
        <!-- 0 to 503-->
  <physCellID> 270 </physCellID>
    </cellParameters>
    <syncSignals>
        <!-- -60 to 20 DB -->
        <primSynSignalPower>3 </primSynSignalPower>
        <!-- -60 to 20 DB -->
        <secSynSignalPower>3 </secSynSignalPower>
        <!-- 0 to 30 -->
        <secSynSignalMSeq1>0 </secSynSignalMSeq1>
        <!-- 0 to 30 -->
        <secSynSignalMSeq2>1 </secSynSignalMSeq2>
    </syncSignals>
    <macConfig>
        <!-- 1 to 100 -->
  <dlResBlocks>50 </dlResBlocks>
        <!-- 1 to 100 -->
  <ulResBlocks>50 </ulResBlocks>
        <!-- 1 to 100 -->
        <maxHarqRetrans>6 </maxHarqRetrans>
        <!-- 0x0001-0x003C -->
        <startRARntiRange>1 </startRARntiRange>
        <!-- 0x0001-0x003C -->
        <endRARntiRange>50 </endRARntiRange>
        <enableFreqSelectSch>
            <!-- 1 or 100 -->
            <enableFreqSelectiveSchedulingU1>0</enableFreqSelectiveSchedulingU1>
            <!-- 0 or 1 -->
            <enableFreqSelectiveSchedulingD1>0</enableFreqSelectiveSchedulingD1>
        </enableFreqSelectSch>
<ueInactivityTimer>0</ueInactivityTimer>
    </macConfig>
</cellConfigParam>
```

```
receive a request for the purchase or use of a spectrum resource,
wherein the request is received from a wireless broadband
provider  2110
```

↓

```
identify a particular spectrum resource in a list of spectrum
resources that are not currently being used by a broadcast
network, wherein the broadcast network dynamically controls the
allocation of broadcast content streams to spectrum resources for
transmission via a plurality of broadcast transmitters 2115
```

↓

```
transmit information authorizing the wireless broadband provider
to use the particular spectrum resource 2125
```

```
receive viewing information from the device, wherein the viewing
information characterizes behavior of a user of the device in
viewing broadcast content through one or more of the broadcast
transmitters   2310
```

↓

```
select advertising for the user of the device based on the viewing
information   2320
```

↓

```
transmit a content stream corresponding to the selected
advertising to the device via a currently-serving base station of the
wireless network   2325
```

FIG. 23

BROADCAST/BROADBAND CONVERGENCE NETWORK

PRIORITY CLAIM INFORMATION

The present application claims the benefit of priority of provisional application Ser. No. 61/864,631 titled "Broadcast/Broadband Convergence Network" and filed on Aug. 11, 2013, which is hereby incorporated by reference in its entirety as though fully and completely set forth herein.

The present application also claims the benefit of priority of provisional application Ser. No. 61/864,976 titled "Broadcast/Broadband Convergence Network" and filed on Aug. 12, 2013, which is each hereby incorporated by reference in its entirety as though fully and completely set forth herein.

TECHNICAL FIELD

This application relates to the field of telecommunication, and more particularly, to mechanisms for enabling broadcast networks and wireless broadband networks to advantageously cooperate.

DESCRIPTION OF THE RELATED ART

Mobile communications have rapidly increased in usage since the introduction of the first ATSC standard by the Grand Alliance in 1995. The rapid advancement of wireless broadband networks has altered the way content is created, delivered, and consumed. A new generation of consumers has grown up with the always-connected Internet, on-demand content, and social networking in a world not anticipated when ATSC was conceived. In the past two decades significant social, economic, and technological changes have occurred which profoundly impact the way we live, work, and play. Considering the above, further improvements are desirable in mobile broadcast communications.

Despite the advancement in wireless broadband technology, broadcast remains the most cost effective way to deliver content to a large number of viewers concurrently. Harmonization between broadcast and broadband is a matter of economics. Unlike a broadcast system serving linear programming to many viewers simultaneously, content-on-demand requires a unicast system in which the transport cost increases as the number of users increases. Broadband providers have the need to offload traffic from highly congested licensed spectrum to unlicensed spectrum (Wi-Fi, Whitespace) and to broadcast network and spectrum, which represents significant new revenue opportunity for broadcasters.

Harmonization with wireless broadband systems (e.g., LTE) enhances user experience, facilitates sharing of valuable spectrum, and enables equipment (transmitter, base station, and User Equipment (UE)) to support both broadcast and wireless broadband at minimal incremental cost.

Content-on-demand is clearly the preferred user experience of the Internet generation. Enhancing the conventional broadcast paradigm with unicast user experience seamlessly is therefore desirable for the long term success of the broadcast industry.

The Next Generation Broadcast Platform (NGBP) preserves the conventional broadcast model while providing additional revenue generating options for broadcasters to leverage wireless broadband.

Further improvements in mobile broadcast and broadband networks are desirable, particularly related to the convergence of these networks.

SUMMARY OF THE EMBODIMENTS

In one set of embodiments, a spectrum server for allocating available broadcast spectrum resources under carrier aggregation may be configured as follows. The spectrum server may include one or more processors and memory. The memory stores program instructions, wherein the program instructions, when executed by the one or more processors, cause the one or more processors to: (a) receive information indicating broadcast spectrum (e.g., one or more channels, not necessarily contiguous) made available by one or more broadcast networks; (b) assign at least a portion (perhaps all) of the available broadcast spectrum to a wireless broadband network in response to a request from the wireless broadband network, wherein said assigned at least a portion is defined by an interval of resource block numbers (or, by one or more intervals of resource block numbers) according to a partition of the available broadcast spectrum into resource blocks of fixed width; and (c) transmit a message to the wireless broadband network, wherein the message identifies the interval of resource block numbers (or, identifies the the one or more intervals of resource block numbers).

In one set of embodiments, a spectrum server for allocating available broadcast spectrum resources under carrier aggregation may be configured as follows. The spectrum server may include one or more processors and memory. The memory stores program instructions, wherein the program instructions, when executed by the one or more processors, cause the one or more processors to: (a) combine channels of broadcast spectrum made available by one or more broadcast networks to form a contiguous band; (b) assign a contiguous portion of the contiguous band to a wireless broadband network in response to a request from the wireless broadband network, wherein the contiguous portion is defined by an interval of resource block numbers according to a partition of the contiguous band into resource blocks of fixed width; and (c) transmit a message to the wireless broadband network, wherein the message identifies the interval of resource block numbers.

In one set of embodiments, a base station for operation as part of a wireless broadband network may be configured as follows. The base station may enable dynamic aggregation of spectrum resources, and may include circuitry configured to wirelessly transmit a downlink signal (e.g., OFDM signal) to one or more devices using aggregated spectrum resources including a portion of broadband spectrum and a portion of broadcast spectrum. The portion of broadcast spectrum has been made available by one or more broadcast networks and dynamically assigned to the wireless broadband network by a spectrum server. The portion of broadcast spectrum is specified by the spectrum server as an interval of resource block numbers (or, as one or more intervals of resource block numbers) according to a partition of a band of the broadcast spectrum into resource blocks of fixed width.

In one set of embodiments, a device enabling dynamic aggregation of spectrum resources may include circuitry configured to wirelessly communicate with one or more base stations associated with a wireless broadband network. The communication may include receiving a downlink signal (e.g., OFDM signal) transmitted by a first of the one or more base stations, where the downlink signal uses aggregated spectrum resources including a portion of broadband spectrum and a portion of broadcast spectrum. The portion of broadcast spectrum has been made available by one or more broadcast networks and dynamically assigned to the wireless broadband network by a spectrum server. The portion of broadcast spectrum is specified by the spectrum server as an interval of resource block numbers (or, as one or more intervals of resource block numbers) according to a partition of a contiguous band of the broadcast spectrum into resource blocks of fixed width.

In one set of embodiments, a base station for use as part of a wireless network may include one or more primary-band (PB) radios, one or more additional radios, and a controller. Each of the PB radios is configured to transmit at least over a respective one of one or more primary bands. Each of the one or more additional radios has a carrier frequency that is dynamically tunable or programmable to any of multiple frequency bands within the radio spectrum. The controller configured to: (a) receive information identifying a first dynamically-allocated spectrum resource: (b) tune or program a first of the one or more additional radios to a first carrier frequency corresponding to the first dynamically-allocated spectrum resource; (c) receive a data stream from an infrastructure network; (d) divide the data stream into a first set of substreams; (e) direct a parallel transmission of the substreams of the first set using respectively the one or more PB radios and the first additional radio.

In one set of embodiments, a device for operation as part of a wireless broadband network may include one or more primary-band transceivers, one or more receivers and a controller. Each of the PB transceivers is configured to wirelessly communicate with a base station of the wireless broadband network using a respective one of one or more primary bands within a radio spectrum. Each of the one or more receivers has a carrier frequency that is dynamically tunable or programmable to any of multiple frequency bands within the radio spectrum. The controller may be configured to: (a) receive one or more network data streams from a base station of the wireless broadband network using the one or more PB transceivers; (b) tune or program a first of the one or more receivers to a carrier frequency corresponding to a first currently-available spectrum resource of the radio spectrum in response to receiving a first message from the base station, wherein the first message identifies the first currently-available spectrum resource; (c) receive a first additional network data stream from the base station using the first receiver after having tuned or programmed the first receiver; and (d) combine the one or more network data streams and the first additional network data stream to obtain an aggregate data stream.

In one set of embodiments, a device for operation as part of a wireless broadband network and for reception of one or more broadcast signals transmitted by a broadcast network including one or more broadcast transmitters, may include: one or more primary-band transceivers, one or more receivers and a controller. Each of the PB transceivers is configured to wirelessly communicate with a base station of the wireless broadband network using a respective one of one or more primary bands within a radio spectrum. Each of the one or more receivers has a carrier frequency that is dynamically tunable or programmable to any of multiple frequency bands within the radio spectrum. The controller may be configured to: (a) receive one or more network data streams from a base station of the wireless broadband network using the one or more PB transceivers; (b) tune or program a first of the one or more receivers to a first broadcast frequency corresponding to a first broadcast signal transmitted by a first of the broadcast transmitters; and (c) in response to said tuning or programming, recover a first broadcast data stream from the first broadcast signal using the first receiver, wherein the first broadcast data stream comprises data that has been off-loaded by the wireless broadband network to the broadcast network for broadcast via at least one of the one or more broadcast transmitters.

In one set of embodiments, a method for operating a spectrum server (to facilitate the sale (e.g., dynamic, pre-negotiated, or pre-arranged) of available spectrum resources to wireless broadband providers) may include: (a) receiving a request for the purchase or use of a spectrum resource, wherein the request is received from a wireless broadband provider, (b) identifying a particular spectrum resource in a list of spectrum resources that are not currently being used by a broadcast network, wherein the broadcast network dynamically controls the allocation of broadcast content streams to spectrum resources for transmission via a plurality of broadcast transmitters; and (c) transmitting information authorizing the wireless broadband provider to use the particular spectrum resource. Note that the term "sale" is to be interpreted broadly. (For example, an auction is considered a form of sale.)

In some embodiments, the method may also include receiving payment, the promise of payment, or other consideration from the wireless broadband provider. This step may occur in any order relative to the above-described steps (a) through (c). Indeed, payment may occur after (e.g., long after) the steps (a), (b) and (c) have been completed. In some embodiments, some form of exchange may be performed instead of payment or in addition to payment.

In one set of embodiments, a method for operating a server as part of a wireless broadband network (to facilitate the purchase, e.g., the dynamic purchase, of spectrum resources, wherein base stations of the wireless broadband network operate in the same geographical region as a broadcast network including a set of broadcast transmitters) may include: (a) receiving a first message indicating that a given one of the base stations in the wireless network currently needs additional bandwidth; (b) in response to the first message, sending a request to a broadcast server for purchase or use of a currently-available spectrum resource in a geographical neighborhood of the given base station; and (c) receiving from the broadcast server a second message identifying a particular currently-available spectrum resource, wherein the broadcast network has agreed that it will not transmit using the particular currently-available spectrum resource within the geographical neighborhood of the given base station. Note that the above request is not necessarily a request for purchase. In some embodiments, there may be an exchange between the broadcaster(s) and the wireless broadband network. For example, from the broadcasters' perspective, they may exchange the use of their broadcast spectrum for the use of the wireless carrier spectrum as a return channel for targeted advertisement.

In one set of embodiments, a method for operating an advertising server may be performed as follows. The method may be performed as part of a wireless network to provide targeted advertising to a device that is configured for communication with a wireless network and for reception from broadcast transmitters of a broadcast network. The method may include: (a) receiving viewing information from the device, wherein the viewing information characterizes behavior of a user of the device in viewing broadcast content through one or more of the broadcast transmitters; (b) selecting advertising for the user of the device based on the viewing information; and (c) transmitting a content stream corresponding to the selected advertising to the device via a currently-serving base station of the wireless network. The method may also include receiving viewer information (e.g., location, activities, browsing history, social media info, or sensor data, etc.) from the device. The selection step (b) may be performed based on the viewer information and/or the above-described viewing information.

In one set of embodiments, a method for operating an advertising server may be performed as follows. The method may be performed as part of a wireless network to provide targeted advertising to a device that is configured for communication with a wireless network and for reception from broadcast transmitters of a broadcast network. The method may include: (a) receiving viewing information from the device, wherein the viewing information characterizes behavior of a user of the device in viewing broadcast content through one or more of the broadcast transmitters; (b) adding the viewing information to a user-specific record stored in a memory medium; (c) selecting advertising for the user of the device based on a current state of the user-specific record; and (d) transmitting a content stream corresponding to the selected advertising to the device via a currently-serving base station of the wireless network.

BRIEF DESCRIPTION OF THE DRAWINGS

FIGS. 3 and 4 present Tables 1 and 2, which extend the PHY to include multiple candidate CP lengths, expressed as a percentage of the FFT duration, as well as additional scaling in subcarrier spacing to extend the symbol duration beyond that afforded by the existing eMBMS PHY specification.

FIG. 5 presents Table 3, which shows RF system configuration via the MIB/SIB.

FIGS. 8 and 9 present Tables 4 and 5, which show system throughput for 6 MHz signal bandwidth and 8 of 10 eMBMS subframes (SFs) per frame.

FIG. 12 presents Table 6, which illustrates an example of a channel encoding scheme, according to one embodiment.

FIG. 13 presents Table 7, which shows a set of supported bandwidth classes, according to one embodiment.

FIG. 14 gives an example of EARFCN assignment and system configuration, according to one embodiment.

FIG. 21 illustrates one embodiment of a method for operating a spectrum server to facilitate the dynamic sale of available spectrum resources to wireless broadband providers.

FIG. 23 illustrates one embodiment of a method for operating an advertising server.

Figure 1:
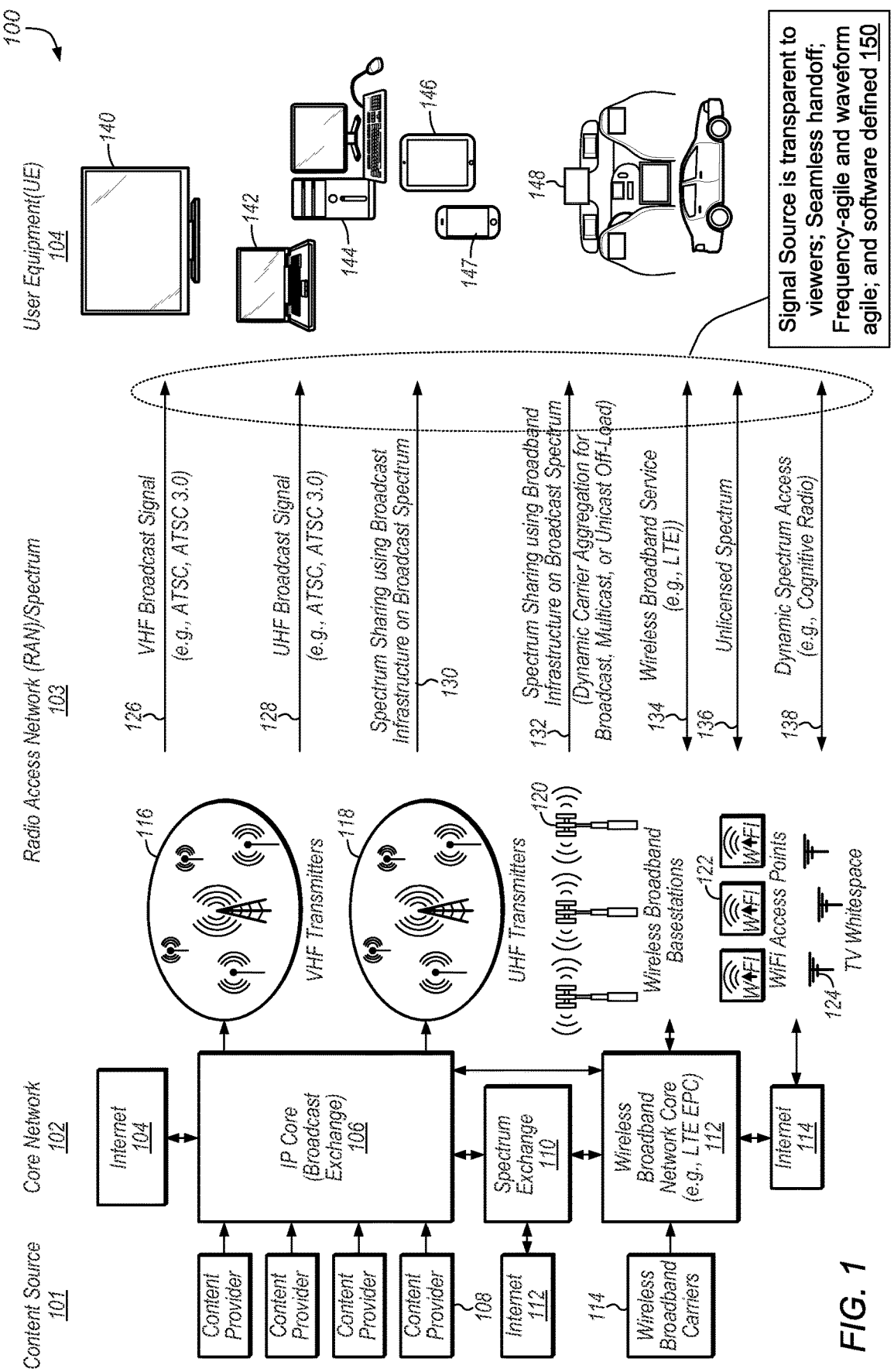
FIG. 1 depicts a broadcast/broadband convergence system delivering content from content sources to User Equipment (UE) devices according to one embodiment.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Flowchart diagrams are provided to illustrate exemplary embodiments, and are not intended to limit the disclosure to the particular steps illustrated. In various embodiments, some of the method elements shown may be performed concurrently, performed in a different order than shown, or omitted. Additional method elements may also be performed as desired.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six interpretation for that unit/circuit/component. More generally, the recitation of any element is expressly intended not to invoke 35 U.S.C. § 112, paragraph six interpretation for that element unless the language "means for" or "step for" is specifically recited.

DETAILED DESCRIPTION OF EMBODIMENTS

List of Acronyms Used in the Present Patent

ATSC Advanced Television Systems Committee
BB Broadband

BC Broadcast
CA Carrier Aggregation
CC Component Carriers
CCCH Common Control CHannel
CP Cyclic Prefix
DCCH Dedicated Control CHannel
DL Downlink
DVB Digital Video Broadcast
EARFCN E-Utra Absolute Radio-Frequency Channel Number
eMBMS evolved Multimedia Broadcast Multicast Service
EPS Evolved Packet System
GI Guard Interval
GW Gateway
HD Radio: High-Definition Radio
LTE Long Term Evolution
MAC Medium Access Control
MIB Master Information Block
MME Mobility Management Entity
NAS Non-Access Stratum
OFDM Orthogonal Frequency-Division Multiplexing
PBCH Physical Broadcast CHannel
PDCP Packet Data Convergence Protocol
PDN Packet Data Network
PCC Policy and Charging Control
PDSCH Physical Downlink Shared Channel
PDCCH Physical Downlink Control Channel
PHICH Physical Hybrid ARQ Indication Channel
PSS Primary Synchronization Signal
SF SubFrame
SFN Single Frequency Network
SIB System Information Block
SRB Signaling Radio Bearer
SSS Secondary Synchronization Signal
UE User Equipment
UL Uplink Terminology Used in the Present Patent Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Computer System—any of various types of computing or processing systems, including a personal computer system (PC), mainframe computer system, workstation, network appliance, internet appliance, personal digital assistant (PDA), grid computing system, cloud server or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portablem, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless cellular telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1 depicts one embodiment of a broadcast/broadband convergence system 100 delivering content from content sources to User Equipment (UE) devices. This system provides significantly enhanced mobile capability to the broadcast industry, an additional revenue source for the broadcast industry, additional spectrum for the broadband industry through sharing, and an enriched user experience. All existing business models may be preserved so that there is no need for a synchronized transition from today's system to the new system.

The broadcast/broadband convergence network architecture applies to various 2G/3G/4G broadband networks and various broadcast networks. LTE and ATSC convergence will be used as an example. The communication links between systems in FIG. 1 are logical connections, not necessarily a dedicated physical link. For example, many communication links may take place over a common network (e.g., the internet), many systems may co-locate or merge as one, and both distributed and centralized control schemes are allowed. The purpose of FIG. 1 is to illustrate the fundamental operating principle of the network. Various configurations and topologies are possible to achieve the same goal.

As shown in FIG. 1, the broadcast/broadband convergence network architecture may be organized in terms of the following categories: content source 101, core network 102, random access network (RAN)/spectrum 103 and user equipment 104.

Content providers such as content provider 108 may supply content (e.g., video information) to the IP Core 106. Spectrum exchange 110 may send and receive content and/or other information to/from the Internet 112. Wireless broadband network core 112 may receive content from wireless broadband carriers 114.

The IP Core 106 (or broadcast exchange) may provide content streams to transmitters such as VHF transmitters 116 and UHF transmitters 118. The VHF transmitters generate VHF broadcast signals (e.g., ATSC signals or ATSC 3.0 signals) such as signal 126. The UHF transmitters generate UHF broadcast signals (e.g., ATSC signals or ATSC 3.0 signals) such as signal 128.

Wireless broadband network core 112 (e.g., LTE Evolved Packet Core) may use wireless broadband base stations such as base station 120 to send and receive data streams to/from users. Thus, the wireless base stations provide wireless broadband service 134 (such as LTE) to user devices.

Unlicensed spectrum 136 may be used to communicate with users. For example, the broadband network core 112 and/or Internet 114 may send and receive data streams to/from user devices via WiFi access points such as access point 122 and/or TV whitespace equipment 124. Furthermore, dynamic spectrum access 138 (e.g., cognitive radio) may be employed.

Spectrum exchange 110 may mediate the sale or exchange of spectral resources made available by broadcasters to wireless broadband providers. Spectrum exchange couples to IP Core 106 and to wireless broadband network core 112. The IP Core 106 may also couple more directly to the broadband network core 112, bypassing spectrum exchange 110, e.g., allowing the broadband network core 112 to off-load data for broadcast by one or more broadcast networks.

The broadband network core 122 may off load content to the IP Core 106, so the content will be broadcasted by one or more transmitters of the broadcast network, e.g., as illustrated by spectrum sharing 130. In this form a spectrum sharing, a broadcast network transmits off-loaded content on behalf a broadband network. Thus, the broadcast network may generate revenue from broadband networks by providing such off loading service. The off-loaded content may also be regular broadcast content which may be received by the UE 104 without explicit control or financial contribution of the broadband providers, thus effectively delivering content to the UE using broadcast spectrum while preserving broadband spectrum for other use (e.g., unicast).

The broadcast network may also make portions of the radio spectrum available to the broadband network when the broadcast network does not plan to use that spectrum for its broadcast transmissions. Thus, the IP Core 106 may communicate to the spectrum exchange information identifying such available portions of the radio spectrum. The spectrum exchange 110 may maintain a database of such available portions and make them available for sale to or exchange with broadband networks. Thus, the broadcast networks are able to generate revenue from portions of spectrum even during times they are not actively broadcasting on those portions. This feature is represented in FIG. 1 by spectrum sharing 132.

A wide variety of UE devices 104 may be served by the convergence system 100, e.g., devices such as televisions 140, laptop computer 142, desktop computers 144, tablets 146, mobile devices 147, devices embedded in automobiles 148 or other vehicles, etc. As indicated at 150, in some embodiments, the signal source (among the various possible sources) may be transparent to viewers; handoff may be seamless; the system provides frequency agile and waveform agile signal transmissions; the waveforms may be software defined.

Broadcast Mode

The broadcast mode in the Internet age is essentially the conventional broadcast paradigm with the option of using existing wireless broadband network as the uplink (e.g., Wi-Fi, LTE, whitespace, etc.). The two transports operate independently with the broadcaster solely occupying the broadcast spectrum and transmitting to a broadcast receiver in the UE. The UE may contain a wireless broadband transceiver, capable of two way DL/UL communication, operating on licensed and/or unlicensed broadband spectrum.

There are three usage scenarios in the broadcast mode:

a) Non-real time uplink: The user runs a broadcast TV application in the UE, which controls the broadcast receiver similar to watching conventional TV. The TV application collects statistics and other data on the viewing habits of the user. When the device is connected to a broadband network, the collected data will be transferred to a broadcaster server for rating, targeted advertisement, and other data mining purposes.

b) Real-time uplink: A broadband connection is used for uplink in a real time interactive mode. User feedback and broadcast response to user feedback are instantaneous. The full internet experience, such as social networking, communication, and data access, is available to the user while viewing broadcast content. Association between the broadcast transport and the broadband return channel are accomplished via established internetworking protocols between the broadband and broadcast networks.

c) No uplink: The user opts out of the uplink option. No data collection, no interactivity, and no uplink. Like a conventional TV.

Broadcast/Broadband Spectrum Sharing Mode

Broadcast and broadband spectrum utilization are in general complementary. For example, the peak broadband spectrum usage is usually during day time business hours, whereas the peak broadcast revenue generation occurs in evening prime time. From the user perspective, despite the preference for on-demand content in general, time-sensitive broadcast contents such as live events, news, and first airing of popular TV shows are exceptions to the on-demand preference. Spectrum sharing provides additional revenue opportunity for broadcaster to maximize the return by applying the valuable spectrum to carrying different payloads at different times.

Broadcast Exchange

In one spectrum sharing mode, wireless broadband network content which can benefit from the economics of the broadcast paradigm, can be off-loaded to a converged broadcast network as proposed by the Sinclair Broadcast Group. For example, see the following:

1) Mark A. Aitken, Mike Simon, "Exploring Innovative Opportunities in ATSC Broadcasting," ATSC Symposium on Next Generation Broadcast Television, 15 Feb. 2011, Rancho Mirage, Calif.
2) Mark A. Aitken, "Broadcast Convergence—Bringing efficiency to a new platform," Society of Motion Picture & Television Engineers (SMPTE) 2011 Annual Conference, Oct. 25-27, 2011, Hollywood, Calif.
3) Mark A. Aitken, "Broadcast—The Technology and the Medium," Sinclair Broadcast Group, 61$^{st}$ Annual IEEE Broadcast Symposium, Alexandria, Va., 19-21 Oct. 2011.

A broadcast exchange is created to enable the aggregation of broadcast spectrum and/or broadcast infrastructure (e.g., transmission towers) by broadcasters in a given area, ranging from a regional basis (e.g., a Designed Market Area (DMA)) to a national basis. The Broadcast Exchange is responsible for delivering content from member broadcasters using the pool of scarce spectrum resources in the most efficient and effective way in terms of coverage, revenue, (e.g., people served/Mhz, revenue/Mhz) and Quality of Service (QOS).

The aggregation of spectrum to form a Broadcast Exchange is through the voluntary cooperation/agreement of the broadcasters. Some broadcasters may prefer to maintain the current broadcast model. Therefore, the broadcast/broadband convergence network is designed to support all existing business models. The centralized control scheme of a Broadcast Exchange is not a requirement to benefit from the enhanced mobile reception, tiered services (e.g., from free advertisement supported content to paid subscription), mobile-friendly, and internet-friendly user experience offered by the new broadcast/broadband convergence network.

In the current broadcast model, a broadcaster occupies an entire broadcast channel (e.g., 6 MHz in the US) for its exclusive use 27×7 even though, for many TV stations, a small number of programs generate the majority of revenue and profit. In the new model, the Broadcast Exchange is aimed at eliminating the inefficiency in spectrum usage, providing maximum flexibility in delivering content through VHF (optimized for fixed devices) or UHF frequency/transmitters (optimized for mobile devices), and maximizing the revenue potential of the broadcast spectrum for its members.

For instance, additional bandwidth can be freed up through the adoption of next generation codec and an efficient market-driven mechanism to distribute available bandwidth to different content by adjusting the resolution (from SD, HD, to 4K and beyond). Some broadcasters may choose to broadcast content only during prime time hours and free up spectrum in the pool for other uses during day time to generate more revenue. The Broadcast Exchange server effectively repacks the broadcast spectrum to deliver contents efficiently for its member broadcasters and allocate surplus spectrum for other applications including, but not limited to, 4G data offload for wireless carriers, non-real time data delivery, delivery mechanism for other content providers besides broadcasters, Over the Top (OTT) content owners, public services, etc.

Spectrum repacking or repacking TV stations into a smaller block of spectrum is historically the function of a regulatory agency (e.g., FCC in the US) through a legislative process. Unlike spectrum repacking through legislative means, the centralized and coordinated spectrum repacking performed by the Broadcast exchange is dynamic and market driven. In addition to improving the efficiency of spectrum usage for broadcast, broadcast exchanges' control of real time dynamic spectrum repacking is useful to creating high value surplus spectrum with minimum interference for non-broadcast use when low power broadband network may have to operate in the vicinity of high power broadcast network.

Spectrum Exchange

In another spectrum sharing mode, broadcasters will be the primary user of the broadcast spectrum. Broadcasters can share the broadcast spectrum with wireless broadband carriers by shutting off the transmitter and relinquishing control of the spectrum to wireless broadband. Unlike conventional spectrum sharing schemes, spectrum sensing is not required due to the coordination between broadcast and broadband network servers.

Spectrum sharing is enabled whenever spare capacity becomes available on the broadcast transport spectrum. Whenever possible, the broadband network aggregates capacity from any channels designated as available (i.e. unused by the broadcast network). The availability of unused broadcast channels may vary by market/geography as well as by day of the week and/or time of day. When vacant, the broadcast channel capacity can be redirected to augment the broadband channel capacity until the use of that channel spectrum is reclaimed by the broadcast network for broadcast use.

The spectrum exchange acquires wholesale spectrum blocks from the broadcast exchange and makes them available for broadband use in blocks of variable time duration. The length of the blocks, the schedule of channel availability, and the number of channels available in any geographic location may be determined statically in advance or dynamically in real time based on market conditions.

When the spectrum is under the control of wireless broadband, wireless operators have the option of using the broadcast towers as macro towers in addition to other towers under carrier control. (The term "macro tower" refers to a high power base station covering a large macro-cell.) In the case of LTE, wireless broadband operators also have the option to use LTE, LTE+eMBMS, or LTE+enhanced eMBMS.

Carrier Aggregation

Carrier aggregation is the mechanism by which the broadcast spectrum is applied to off-load wireless traffic for broadband carriers. In the case of a broadcast spectrum restricted to transmit only, it will be used to offload only the down link (DL) traffic for the broadband network. There is no technical limitation on using broadcast spectrum for both uplink and downlink offload should the legislation allow such application.

The off-load spectrum, controlled by an entity which may not be the carrier, can be used to serve multiple wireless broadband carriers. This is different from the conventional notion that all spectrum used in carrier aggregation is controlled by a single carrier for the sole purpose of serving the network of that single carrier.

Programmable Radio Chipset for Next Generation UE

Figure 2A:
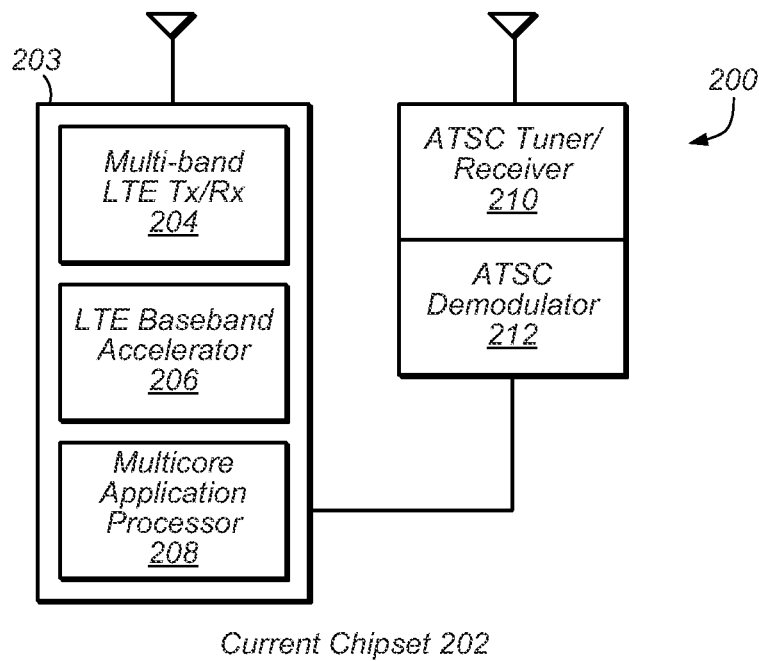
FIG. 2A is a block diagram illustrating a current generation chipset.
Figure 2B:
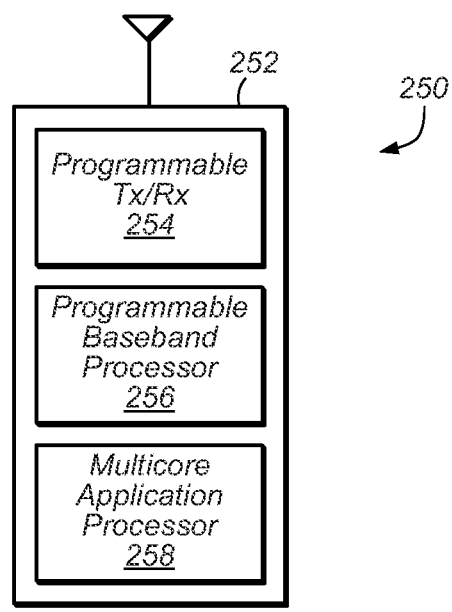
FIG. 2B is a block diagram illustrating a new generation chipset according to one embodiment.

FIG. 2B depicts the architecture of a new generation user equipment (UE) 250 to fully leverage the capability of the broadcast/broadband convergence network. Unlike previous architectures such as the architecture of UE 200 shown in FIG. 2A, the proposed architecture enables evolution over time, similar to the evolution of the LTE wireless broadband standard. (LTE is an acronym for "Long Term Evolution".) By using a software-defined architecture, the UE 250 is adaptable to evolving standards. One goal of the proposed architecture is to be the last TV transition, at least in our life time. By harmonizing with LTE, the incremental cost of supporting both broadcast and broadband is minimal, and the same chipset can be used in all fixed and mobile devices.

As shown in FIG. 2A, today's radio chipset 202 includes a multi-band LTE transceiver 204, an LTE baseband accelerator 206, a multicore application processor 208, an ATSC tuner/receiver 210 and an ATSC demodulator 212. The external ATSC tuner/receiver incurs added bill of materials (BOM) cost, royalty, circuit board real estate and power consumption). LTE RF support is limited to a few bands (out of 40+ 3GPP LTE bands). Baseband processing is mostly hardwired circuitry with limited flexibility. Broadcast and broadband are separate functions.

As shown in FIG. 2B, the new generation chipset 252 includes a programmable transceiver 254, a programmable baseband processor 256 and a multicore application processor 258. The programmable baseband processor 256 supports multiple waveforms by configuring or programming the same hardware resources. (For example, ATSC 3.0 and LTE at the same time. The programmable baseband processor enables a single chip solution. Thus, no separate ATSC or broadcast support chip is required.) The RF transmitter/receiver 254 is programmable, to support all bands from VHF/UHF to a minimum of 5 GHz. The new generation chipset 252 includes a software stack to support broadcast/broadband convergence and off-load.

User Experience

From the user's perspective, the conventional notion of tuning into a TV channel becomes irrelevant. By invoking an application in a mobile device, the user is presented with a list of programs and/or content he/she can choose from without any reference to a fixed channel number. Through the dynamic allocation of spectrum for content delivery by the broadcast exchange, the channel by which a content stream is delivered may change from time to time and made transparent to the user, including seamless handoff between channels and/or between broadcast and broadband infrastructure.

The viewing experience on fixed receivers (e.g., connected TV) is equally enriched by the "TV Everywhere" capability of the broadcast/broadband convergence network. Without the power and size constraints of mobile devices, fixed receivers enable ultra high resolution display, terrestrial internet connectivity, in addition to wireless connectivity, massive storage, and the interconnection of all devices (including mobile devices and connected automotive) at home.

Enhanced eMBMS

The following sections describe proposed enhancements to the evolved Multimedia Broadcast/Multicast Service (eMBMS) standard, introduced to enable broadcast service delivery over LTE. The proposed service enhancements can be categorized as follows.

(1) PHY extensions (i.e., physical layer extensions) aimed at improving compatibility with broadcast system objectives, including those related to single frequency network (SFN) deployment.

(2) Carrier Aggregation (CA) adapted to enable use of spectrum deemed idle by the broadcast core network, to augment broadband service delivery.

eMBMS System Modifications to Meet Broadcast Performance Objectives

The list of proposed eMBMS modifications comprises multiple PHY enhancements aimed at positioning LTE more favorably with regard to key broadcast performance objectives. This disclosure pertains to eMBMS transport intended for broadcast/multicast service delivery, either in LTE spectrum or spectrum aggregated from unused broadcast channels as described later in the section on Dynamic Spectrum Sharing. The proposed enhancements are not intended to affect non-eMBMS LTE transport associated with unicast service delivery.

The proposed PHY is not a mandatory replacement of existing standards used for one-to-many transport in broadcast spectrum though aspects of this proposed PHY might be used in defining new broadcast operating modes and standards. For example, the current 8 vsb based ATSC standard can co-exist with broadcast TV based on the proposed PHY which is superior to current ATSC in many ways. Should the proposed PHY be adopted as part of the new ASTC standard, such arrangement will enable a gradual transition at a significantly lower transition cost. New generation receivers will support both broadcast streams while legacy receivers will continue to receive only the existing ATSC broadcast.

Devised as an extension of the LTE PHY, eMBMS retains many of the attributes sought in developing a flexible unicast transport placing significant emphasis on low latency and shortened signaling intervals. Given this objective, LTE operates on intervals associated with 1 ms subframe (SF) boundaries consuming an integer number of OFDM symbols per SF. Conventional broadcast standards, e.g. DVB, operate on a much longer time scale admitting variability in symbol duration, i.e. employing different FFT sizes, to afford differing amounts of delay spread tolerance. LTE on the other hand, uses fixed symbol durations, instead extending the signal bandwidth as the FFT size increases.

The proposed PHY extensions have been introduced to address the following perceived deficiencies with the existing eMBMS standard:

Increased Delay Spread Tolerance
Improved Burst Noise Immunity
Higher Bitrate/Increased Throughput Delay Spread Tolerance Single frequency networks simultaneously broadcast identical signal content from multiple towers in a tightly time synchronous manner. SFNs are used in a broadcast arrangement to improve reception by devices at the cell edge. The signal components from multiple base stations appear like multipath at a receiving station located in the overlap region between cells. As a result, SFN deployment requires additional delay spread tolerance as an integral part of the underlying signal transport.

Delay spread tolerance is determined directly by the length of the guard interval (GI), inserted ahead of each OFDM symbol in the form of a cyclic prefix (CP). The cyclic prefix may be expressed as a percentage of the usable OFDM symbol duration $T_{FFT}$. The FFT duration, corresponding to the OFDM symbol contribution prior to adding the CP, is in turn computed as the inverse of the subcarrier spacing, i.e. $T_{FFT}=1/\Delta f$. Reducing the subcarrier spacing increases the symbol duration and hence the duration of the resulting GI. This is a basic principal employed by numerous OFDM systems, e.g. LTE, DVB, HD Radio.

eMBMS System Configuration

The existing eMBMS standard specifies two broadcast operating modes, both of which employ extended CP length. The resulting delay spread tolerance is shown below for the prescribed range in subcarrier spacing:

Extended CP, 15 kHz subcarrier spacing: 16.67 µs delay spread tolerance;

Extended CP, 7.5 kHz subcarrier spacing: 33 µs delay spread tolerance;

Proposed PHY Extensions

The proposed PHY extensions introduce multiple CP lengths along with increased variability in subcarrier spacing to allow increased delay spread tolerance, taking into account the following guiding principles to facilitate future harmonization with prevailing LTE PHY specifications:

1) Sampling rates remain an integer multiple of 3.84 MS/s (derived from the W-CDMA chipping rate).

2) FFT dimensions taken from the existing set {NFFT: 128, 256, 512, 1024, 1536, 2048} and integer multiples thereof, computed as 2 to some power, i.e. $NFFT=2^m$, m=7:11, with the exception of 1536 which is computed as $NFFT=3\times2^m$, m=9.

3) Spectrum is added in integer multiples of a fixed Resource Block (RB) bandwidth of 180 kHz.

4) The system employs an integer number of OFDM symbols including CP per frame (10 ms). The existing LTE PHY employs an integer number of OFDM symbols per 1 ms subframe. Relaxing this requirement may be useful in achieving the required delay spread tolerance without incurring significant CP overhead.

Table 1 and Table 2 (i.e., FIGS. 3 and 4) extend the PHY to include multiple candidate CP lengths, expressed as a percentage of the FFT duration, as well as additional scaling in subcarrier spacing to extend the symbol duration beyond that afforded by the existing eMBMS PHY specification. Other configurations may prove viable. However, the basic principle holds: extending the symbol duration by scaling (e.g., decreasing) the subcarrier spacing then selecting the CP length to deliver the desired delay spread tolerance with minimal overhead. Much like DVB, the proposed PHY enables multiple FFT dimensions (i.e., FFT sizes) to increase the subcarrier spacing for a given signal bandwidth. Unlike DVB, the base configuration may begin with 15 kHz subcarrier spacing in any signal bandwidth and scale from there (upward in FFT dimension, or equivalently, downward in subcarrier spacing).

The eMBMS as currently specified in LTE employs extended CP only with two choices in subcarrier spacing: 15 or 7.5 kHz, affording delay spread tolerance on the order of 16.67 or 33.33 µs, respectively, as indicated in the two shaded columns of Table 1 (i.e., FIG. 3), whereas delay spread for a terrestrial broadcast network can approach 200 µs, given tower separations on the order of 200 or 300 km. With the proposed PHY extensions, guard intervals (GIs) exceeding the required broadcast delay spread tolerance can be readily achieved while reducing CP overhead for higher system throughput.

The existing frame structure restricts use of eMBMS to a subset of the available subframes (SFs) per frame, to accommodate paging, synch and common signaling that would otherwise be obscured by broadcast transmissions. In the subsection entitled "System Throughput", we examine the potential to relax this restriction, enabling eMBMS in 8 of 10 SFs, provided the affected signaling is duly accounted for.

The set of available system parameters given this consideration becomes a function the SF allocation, i.e. 6 vs. 8 of 10 SFs, requiring additional signaling to specify the revised eMBMS configuration.

The last row (i.e., the "Modulus" row) of Tables 1 and 2 indicates the configurations in which the number of symbols per frame is divisible by 6 or 8 or both 6 and 8. Selecting a configuration which conforms to eMBMS in 6 (or 8) of 10 available SFs enables greater flexibility in mapping broadcast services to the eMBMS PHY.

Signaling

The introduction of new system parameters requires corresponding signaling extensions in order to make the new parameter settings discoverable by a UE. The Master Information Block (MIB) contains a limited number of the most frequently used parameters essential for initial cell access. The MIB conveys parameters governing the RF configuration, e.g. signal bandwidth and CP type, i.e. normal or extended. Cell configuration is conveyed in System Information Blocks (SIBs) multiplexed at the physical layer with user data on the Downlink Shared Channel. The set of configurable system parameters shall be extended to enable additional flexibility in system deployment as illustrated in Table 3 (i.e., FIG. 5).

Burst Noise Immunity

The lower VHF band is plagued by man-made and machine noise manifesting in bursts of appreciable duration. Conventional broadcast standards employ long bit/symbol interleavers to overcome the burst noise phenomenon, which would undermine the low latency objectives set for LTE.

In some embodiments, the present patent incorporates unsolicited Hybrid Automatic Repeat reQuest (HARQ) retransmission in place of explicit bit/symbol interleaving, to improve burst noise immunity. It further enables automatic retransmissions scheduled in advance, to permit broadcast operation in Un-Acknowledged Mode (UAM). Based on existing PHY mechanisms, the aim is to extend the data interval beyond the burst duration, avoiding the need to introduce mechanisms that would unduly compromise other aspects of the LTE PHY operation, namely low latency based on a 1 ms SF interval.

Figure 6:
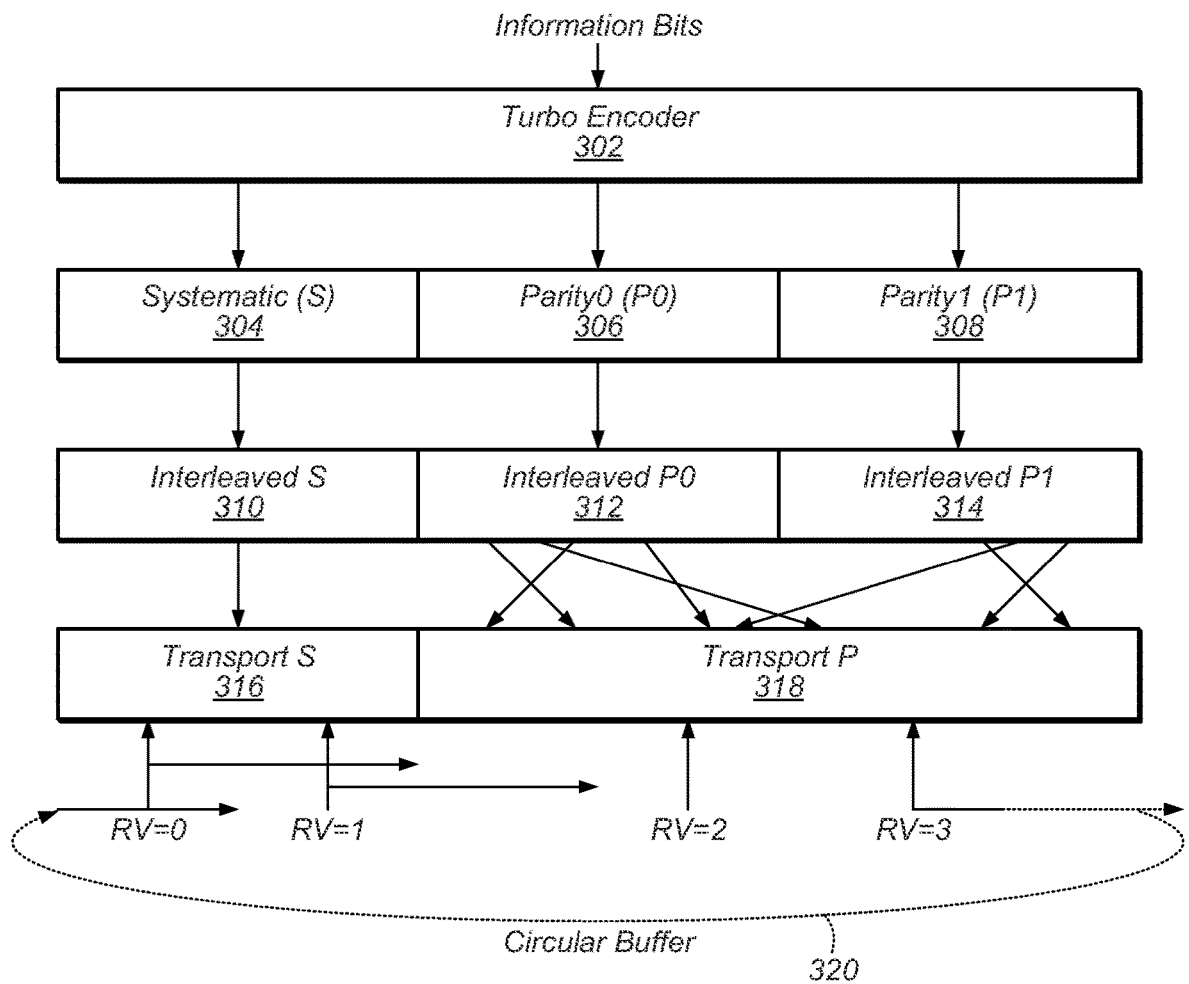
FIG. 6 illustrates a procedure for unsolicited HARQ retransmission, according to one embodiment.

The procedure for unsolicited HARQ Retransmission can be summarized as follows. See FIG. 6.

(A) Follow the original transmission with successive retransmissions, scheduled automatically based on existing HARQ mechanisms, i.e., Redundancy Version (RV) and Circular Buffer Rate Matching.

(B) Operating in UAM, provide incremental redundancy in unsolicited (i.e., scheduled) retransmissions affording time diversity in a manner similar to traditional interleaving.

(C) Combine observations of the original information and code bits at the receiver with code bits recovered from previous transmissions or retransmissions, providing added burst noise immunity.

Ex 1: three successive transmissions (one original+two retransmissions) each at rate R=1 results in an overall coding rate of R=1/3 while providing 3·8+1=25 ms equivalent interleaver depth;

Ex 2: coding rates greater than 1, e.g. R=5/3, might be introduced to enable the max=4 retransmissions, again yielding an overall R=1/3 coding rate while providing (1+4)·8+1=41 ms equivalent interleaver depth.

The Turbo Encoder 302 output bits are parsed into Systematic bits 304 reflecting the original information bit stream, Parity0 306 representing one half of the parity bits, and Parity1 308 representing the remaining parity bits. Systematic bits are interleaved separately 310 and passed to the systematic transport buffer 316. Parity0 and parity 1 and interleaved together and passed to a parity transport buffer 318. With each Redundancy Version (RV), bits are output in a circular fashion 320 from the systematic transport buffer 316 and parity transport buffer 318.

System Throughput

Throughput in an OFDM system is determined by the number of modulated subcarriers, the selected modulation and coding scheme (MCS) and layering of the PHY transport less framing overhead, e.g., reference subcarriers, special transmit symbol/symbol periods set aside for synchronization and signaling. Proposed extensions aimed at improving system throughput include the following:

(1) Increased throughput can be achieved with the introduction of two recognized methods:

(1.1) Higher Order Modulation: enable 256-QAM over the existing 64-QAM maximum DL modulation for use in circumstances where adequate RX SNR is available.

(1.2) Multiple Antenna Techniques: provide spatial diversity gain extending multiple antenna techniques to the transmission modes supported in eMBMS.

(1.2.1) Space Frequency Block Coding (SFBC) enables net improvements in RX SINR (Signal-to-Interference plus Noise Ratio). SFBC comprises multiple transmissions from a single eNB, coded across subcarriers to enable multiple uncorrelated, independent streams delivered in parallel to the RX device. The approach results in increased data rates at the cell edge in the same manner as SFN used by conventional broadcast networks without the need to coordinate among multiple transmit towers.

(1.2.2) SFBC+Frequency Switched Transmit Diversity (FSTD) enables SFBC overcomes the limitation that no orthogonal codes exist for antenna configurations beyond 2×2. FSTD adds switched time diversity enabling SFBC up to 4 transmit antennas.

(1.2.3) 2-Layer Spatial Multiplexing increases the peak throughput on the order of ~2× on top of that achieved through higher order modulation.

(2) Signal Bandwidth: for broadcast deployment, signal bandwidth will be incremented in integer RBs (180 kHz) up to the available broadcast channel bandwidth, i.e. 6/7/8 MHz. DSS, enabling LTE operation in spectrum deemed idle for broadcast services, may retain the existing LTE signal bandwidths and RB allocations to simplify system deployment.

(3) Framing Overhead: Restricting eMBMS transmission to 6 of 10 SFs per frame significantly limits throughput capacity as compared to competing broadcast standards. Scheduling paging in the SFs already carrying primary and secondary synchronization signals (PSS/SSS) eliminates the need to restrict additional SFs, extending use of eMBMS in 8 of 10 SFs for a net increase (33%) in system throughput. PSS, SSS and PBCH, which carry the MIB, are protected by prohibiting eMBMS transmission in SFs 0, 5 (rendered in bold type in FIG. 7), the same as with the existing standard. However, confining paging to SFs 0, 5 as well recovers additional capacity, extending use of eMBMS to include SFs 4, 9, as depicted in FIG. 7.

Figure 7:
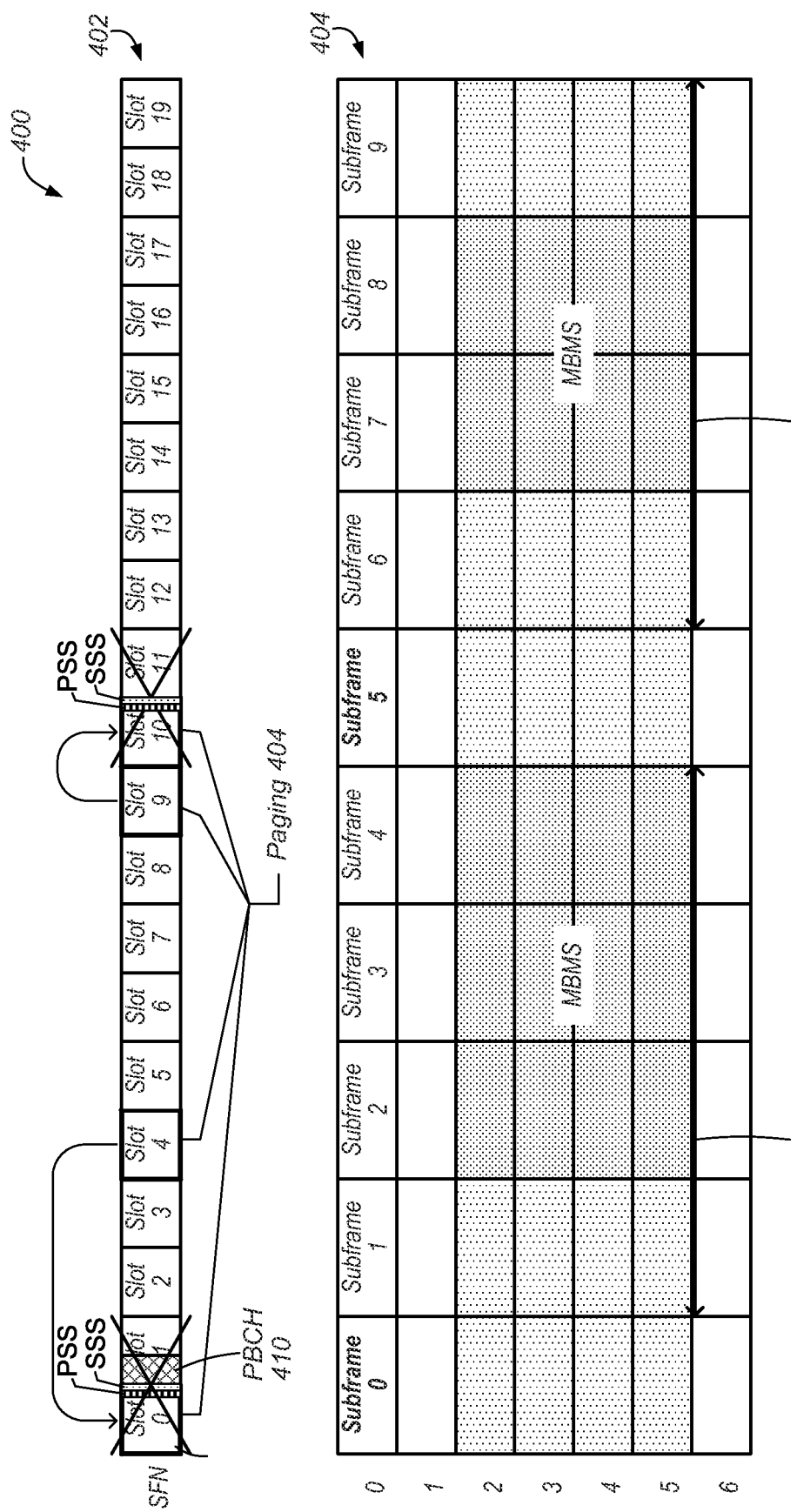
FIG. 7 illustrates a revised eMBMS frane structure, according to one embodiment.

As shown in FIG. 7, an eMBMS frame 400 comprises twenty slots numbered 0 through 19. Two consecutive slots form a subframe. Slots 0, 4, 9, and 10 are unavailable to carry MBMS traffic as they contain paging information 404 delivered to individual user devices. Portions of subframe 0 and subframe 5 are reserved for transmission of PSS, SSS and PBCH 410. The associated subframes are unavailable for broadcast transport further limiting broadcast capacity. Confining paging 404 to slots 0 and 10, reclaims the subframes containing slots 4 and 9 for MBMS transport increasing broadcast capacity with eMBMS. Thus, subframes 412a and subframes 412b are available for broadcast with enhanced eMBMS as presently disclosed.

Gains in system throughput due to the proposed changes are summarized in Tables 4 and 5 (i.e., FIGS. 8 and 9).

Summary of Proposed PHY Enhancements

[Enh 1]: Multiple candidate CP lengths to minimize overhead in achieving increased delay spread tolerance. Extend the MIB/SIB parameter sets accordingly.

[Enh 2]: Additional scaling in subcarrier spacing to increase symbol duration for a fixed signal bandwidth. Extend the MIB/SIB parameter sets accordingly.

[Enh 3]: Extend the DL and UL control channel signaling to accommodate additional CP lengths.

[Enh 4]: Extend the DL and UL control channel signaling to accommodate additional range in subcarrier spacing.

[Enh 5]: Schedule paging and other signaling in the SFs that carry primary and secondary sync, increasing the number of SFs available for eMBMS, from 6 to 8 per frame. Revise the system configuration advertised on MIB/SIB, instructing user devices to confine their use of paging and other control signaling, accordingly.

[Enh 6]: Vary the set of available system parameters, i.e., CP length and subcarrier spacing, as a function of the prescribed eMBMS SF allocation, permitting use of 6 or 8 (or other) out of 10 SFs per frame while retaining full use of extensibility in system parameters affecting delay spread tolerance.

[Enh 7]: Employ Hybrid Automatic Repeat reQuest (HARQ) retransmissions in place of bit/symbol interleaving, to improve burst noise immunity without compromising low latency principles set forth for LTE.

[Enh 8]: Modify HARQ to enable automatic (i.e., pre-scheduled) retransmission, providing incremental redundancy when operating broadcast services in Un-Acknowledged Mode (UAM).

[Enh 9]: Enable higher order modulation (e.g., 256-QAM over existing 64-QAM) for increased maximum system capacity.

[Enh 10]: Extend multiple antenna techniques to the transmission modes supported in eMBMS (e.g. Space-Frequency Block Coding (SFBC), SFBC+Frequency Switched Transmit Diversity (FSTD), 2-layer Spatial Multiplexing (SM)) to improve RX SINR and/or downlink throughput, maximizing system capacity.

[Enh 11]: Extend the signal bandwidth in integer multiples of a fixed Resource Block (RB) structure (e.g., 180 kHz) to extend the existing bandwidth definitions, e.g. 5 MHz, to more fully occupy 6/7/8 MHz broadcast channel bandwidths. This modification is intended for scenarios where LTE or some variant is used to replace the broadcast transport in unoccupied television channels.

Dynamic Spectrum Sharing in a Converged Broadcast-Broadband Transport

Figure 10:
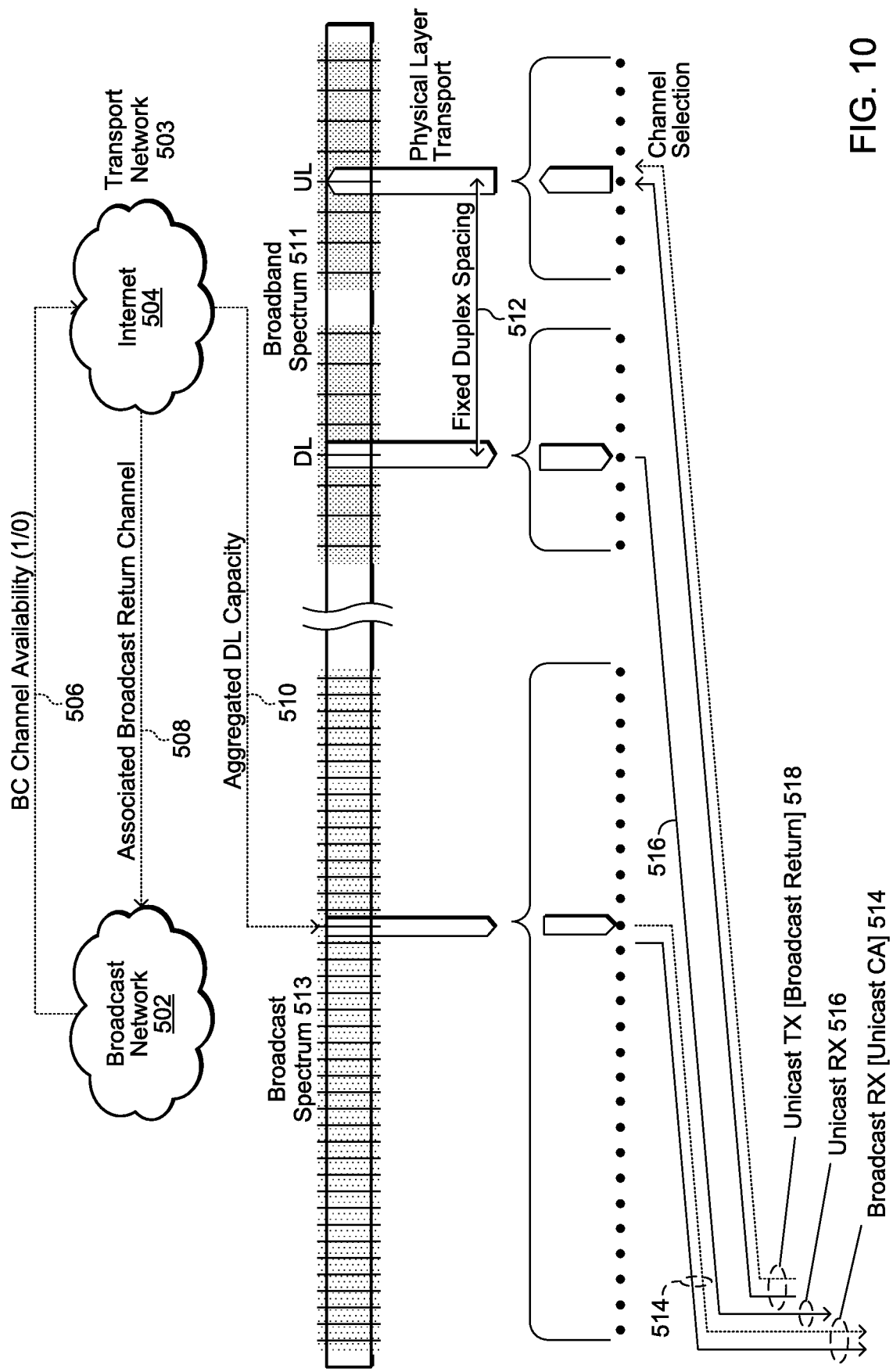
FIG. 10 illustrates dynamic spectrum sharing, according to one embodiment.

Dynamic Spectrum Sharing (DSS) introduces a new mode of spectrum sharing, capable of harnessing unused TV spectrum, to boost LTE downlink data throughput. DSS may use a particular variant of carrier aggregation (CA) that adds channels aggregated from broadcast (BC) radio spectrum in the downlink direction, operating alongside two-way transport separated by a fixed duplex arrangement in broadband (BB) spectrum as depicted in FIG. 10.

The broadcast network 502 continually monitors channel utilization, reporting channels available 506 for carrier aggregation to the transport network 503 via the internet 504. The broadcast return channel 508 is also provided via the internet connection 504. Portions of broadband spectrum 511 are allocated to DL and UL channels separated by a fixed duplex spacing 512. Additional DL capacity 510 is allocated in aggregated broadcast spectrum 513. The allocated broadcast spectrum is assigned to broadcast RX or unicast carrier aggregation (CA) 514 under control of the transport network. Unicast RX 516 is assigned to DL broadband spectrum. Unicast TX or broadcast return channel 518 is assigned to UL broadband spectrum.

Spectrum Server

DSS is enabled by a spectrum server, the responsibilities of which include: monitoring traffic demand from registered eNBs; querying the broadcast exchange for channel availability; and then harmonizing the demand for traffic with the available spectrum.

Upon registering a new eNB, the spectrum server:
  i. determines the level of CA support, i.e. supported bands, maximum number of component carriers (CCs) and maximum aggregate bandwidth;
  ii. establishes the CC update frequency and the maximum duration of an aggregate channel grant, after which access must be re-negotiated; and
  iii. establishes the update frequency used in querying the broadcast exchange for channel availability.

On connection establishment, the eNB in turn determines from a UE its CA capabilities, the details of which are outlined later in this document.

Converged BC-BB Architecture

Figure 11:
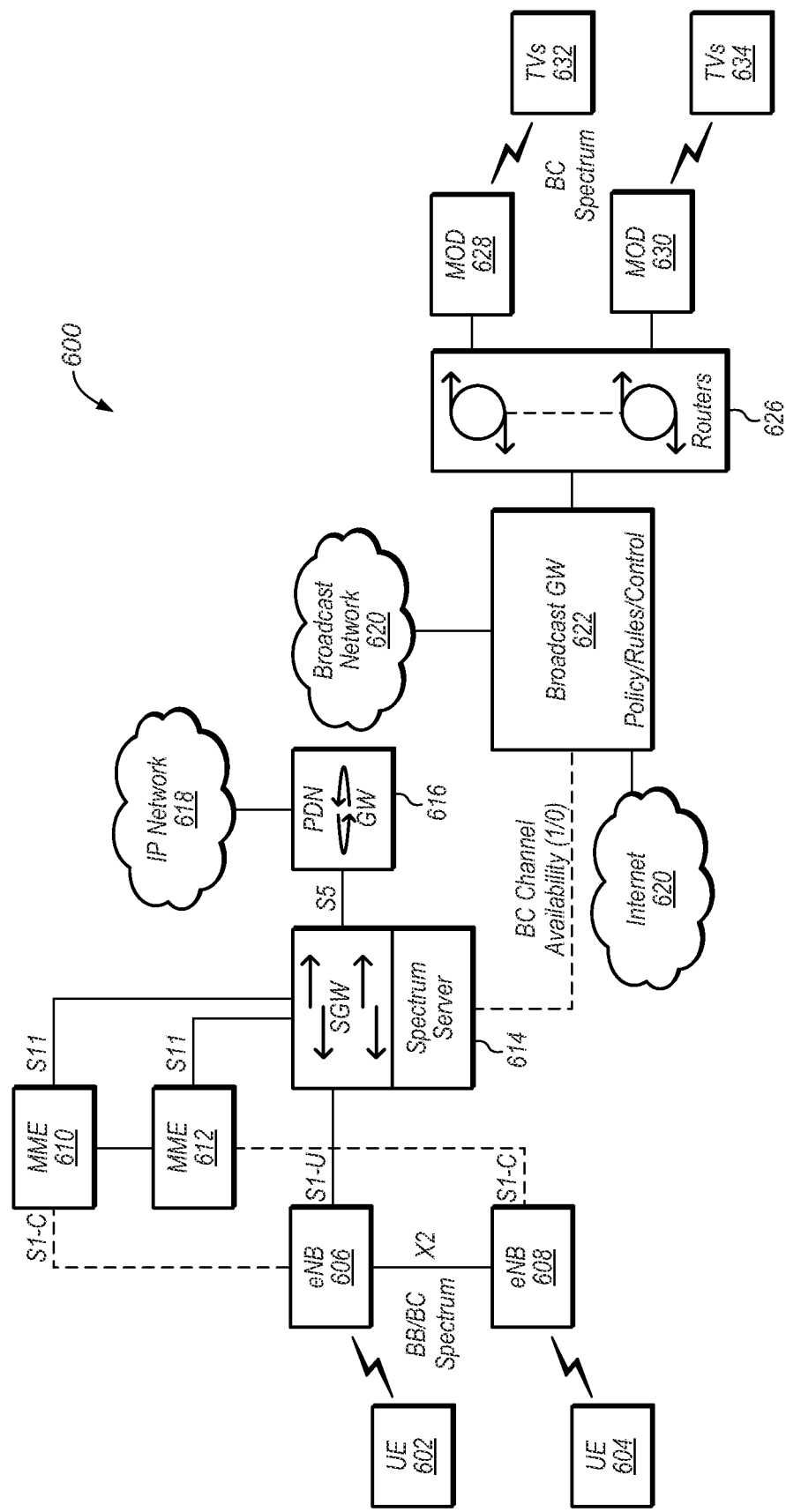
FIG. 11 illustrates a simplified network architecture illustrating cooperation between broadcast and broadband networks to dynamically enable spectrum sharing, according to one embodiment.

FIG. 11 shows a simplified network architecture illustrating cooperation between broadcast and broadband networks to dynamically enable spectrum sharing. The connections between systems denote logical connections and can be physically implemented in various ways.

Administered in this way, with channel availability communicated periodically from a broadcast gateway to a gateway servicing the broadband network, broadcast spectrum utilization is maximized, enabling increased broadband unicast throughput anytime spare capacity is identified in a given geographical area.

As shown in FIG. 11, the converged transport network 600 with spectrum sharing includes a plurality of UEs (suggested by UEs 602 and 604) connected via broadband (BB) and/or broadcast (BC) spectrum to a plurality of eNBs (suggested by eNBs 606 and 608). Each eNB is connected to an associated MME 610 and 612 via respective S1-Control interfaces (each denoted S1-C). S11 from each MME represents path switching and radio bearer control information. User plane data (denoted S1-U) passes through the serving gateway (SGW) as configured by the spectrum server 614. A Packet Data Network (PDN) GW 616 provides access to the IP Network 618. The Broadcast GW 622 relays channel availability to the Spectrum Server 614 based on access policy/rules/control communicated via the internet 620. Broadcast transport streams are sent to the GW 622 from the broadcast network 620 then routed 626 to broadcast modulators 628 and 630. Each modulator 628 and 630 transmit to TV receivers (suggested by receivers 632 and 634) via broadcast spectrum.

Channel Availability

The capabilities of each registered eNB is consulted in determining how to allocate spectrum deemed available by the broadcast exchange, designated (1/0) for each broadcast channel on a per band basis. Table 6 (i.e., FIG. 12) depicts a sample channel encoding, organized in a row/col arrangement for each band allocation in a given regulatory domain. Channel availability for North America can be communicated in 16 bytes: 82 channels requiring 128-bits assessed across 7 bands. The entire mapping is advertised by the broadcast exchange on each query from the spectrum server.

Radio Resource Control (RRC) Procedures

Channel access is granted in LTE based on radio bearers in accordance with Radio Resource Control (RRC) procedures [5].

LTE supports two states: RRC_Idle in which no signaling radio bearers have been established, i.e. no RRC connection; RRC_Connected in which a Signaling Radio Bearers (SRB) has been established, used to transmit RRC and NAS messages:
  (a) SRB0: RRC message using CCCH logical channel.
  (b) SRB1: is for transmitting NAS messages over DCCH logical channel.
  (c) SRB2: is for high priority RRC messages. Transmitted over DCCH logical channel.

RRC procedures include the following based on designated bearer assignments:
  (1) Paging: transmit paging info/system info to UE in RRC_IDLE state.
  (2) RRC Connection Establishment: establish SRB1, initiated by a UE when the upper layers request a signaling connection in RRC_IDLE mode.
  (3) RRC Connection Reconfiguration: establish/modify/release radio bearers after connection establishment or during handover.
  (4) RRC Connection Re-Establishment: re-establish RRC connection, reactivating SRB1.
  (5) Initial Security Activation: activate security upon RRC establishment, eNB initiated.
  (6) RRC Release: release SRBs.

Bearer Establishment

A registered eNB makes extensive use of RRC Connection Reconfiguration to assign additional radio bearers allocated from aggregated broadcast carriers. The MAC acts as a multiplexer, assigning each component carrier its own PHY layer entity with associated channel coding, HARQ, data modulation and resource mapping. The PHY in turn relates the component carriers according to an enumerated list of available RBs up to the channel bandwidth of their RF carrier(s). Each RF carrier is identified by a unique E-UTRA Absolute Radio-Frequency Channel Number (EARFCN) which specifies the UL/DL carrier center frequencies.

In 3GPP vernacular, carrier aggregation from idle broadcast spectrum is considered interband, meaning that the primary component carrier (PCC) residing in a defined LTE band is coupled with a secondary component carrier occupying broadcast spectrum. This designation will be maintained regardless of the proximity of the respective component carrier bands to honor the network separation.

Interband aggregation between broadcast and broadband spectra necessitates definition of new band combinations, as carrier demand for a BC|BB arrangement has as yet not been clearly articulated. (New band combinations may be needed pairing broadcast spectrum, i.e. VHF (low/high) as well as the various UHF bands, with selected LTE bands, e.g. Band 1 (IMT 2100), Band 7 (2.6 GHz), Band 13 (US 700 c Upper), Band 14 (U.S. Public Safety).) Carrier aggregation is only activated in connected mode. A UE preferably has completed the basic access procedures, i.e. cell search and cell selection, acquisition of system information and initial random access, each of which is conducted on the PCC for DL and UL. The SCC introduces additional transmission resources once in the connected state that are associated with the PCC for signaling/control.

UE Capabilities Assessment

EPS bearer establishment, which follows contention resolution as a component of the random access procedure, includes a UE capability assessment to determine among other things supported frequency bands and bandwidth classes, either (non-)contiguous intraband and interband carrier aggregation. Table 7 (i.e., FIG. 13) shows the supported bandwidth classes as of Release 11.

In addition, the UE reports support for carrier aggregation in a given frequency band (intraband) or band combination (interband).

System Design Considerations

Signaling

Signaling for carrier aggregation involves select layers of the protocol stack: RRC, MAC and PHY. The remaining layers are unaffected. For instance, each user device is connected to the serving cell via its PCC. Non-Access Stratum (NAS) functionality such as security key exchange and mobility management are provided by the primary serving cell (PCell). All secondary component carriers are regarded simply as providing additional transmission resources. As a result, carrier aggregation is transparent to the Packet Data Convergence Protocol (PDCP) and Radio Link Control (RLC) layers as well as NAS. The only required change to RLC is that the buffer size must expand to support higher data rates as would be the case for higher order MIMO as well.

PSS and SSS are sent on the PCC as well as any SCCs to enable detection and synchronization in each serving cell. A maximum of four secondary cells (SCell) can be activated. For each cell, its physical identity is sent including the EARFCN indicating the explicit downlink carrier frequency along with common information applicable to all devices to which this carrier will be added, e.g. bandwidth, PHICH and PDSCH configuration, and dedicated information applicable to a particular terminal, e.g. activation and use of cross-carrier scheduling.

Channel Assignment

The spectrum server is responsible for periodically revising channel assignments at each of its registered eNBs as the broadcast gateway updates the availability of aggregate spectrum. The task of channel assignment must take several considerations into account in doling out new spectrum:

(A) Aggregate the available broadcast spectrum into contiguous bands to account for the likelihood that a user device, associated with a particular secondary cell, has a limited number of radio receivers to support carrier aggregation.

(B) Assign the available spectrum in integer multiples of a fixed RB bandwidth, designating the aggregate channel bandwidth according the channel at the aggregated band center. For instance, given channels 51, 52, 53 available as a contiguous block, assign 98 RBs (i.e. 3-channels, each yielding 6 MHz=18 MHz/180 kHz minus 2 RBs to preserve band edge spacing=100−2=98, where RB bandwidth is 180 kHz) numbered +/−49 on either side of the channel 52 center frequency. In other words, the 98 RBs may be numbered {−49, −48, −47, . . . , −2, −1, 0, 1, 2, . . . , 47, 48}. However, a wide variety of other numbering schemes are possible and contemplated.

(C) Define a channel numbering scheme that accounts for carrier aggregation from either an odd or even number of the available broadcast channels. If channels 51, 52, 53, 54 are available as a contiguous block, assign 132 RBs (i.e. 4-channels, each yielding 6 MHz=24 MHz/180 kHz minus band edge spacing) numbered +/−66 on either side of the frequency separating channels 52 and 53.

(D) Designate the two modes as band center oriented (BCO) corresponding to an odd number of aggregated channels or band edge oriented (BEO) corresponding to an even number of aggregated channels.

(E) Determine the number of aggregate RBs as a function of the broadcast channel bandwidth, i.e. allocated in multiples of 6, 7 or 8 MHz, depending on the regulatory domain.

(F) Number the aggregated spectrum up to an even integer multiple of a fixed RB bandwidth.

(G) Allocate the available RBs on either side of the band center frequency to avoid signal power in the DC subcarrier of the DL OFDM signal.

(H) Limit the number of RBs available in a given aggregate bandwidth to preserve required band edge spacing. The number of RBs allocated on either side of the aggregated band center is determined by the number of available channels (N) times the signal bandwidth (per regulatory domain) less the spacing required at the band edge divided by the fixed RB bandwidth, i.e., floor((N×6/7/8−2×BandEdgeSpacing)/$RB\_BW$/2).

The notation "6/7/8 MHz" means "6 MHz or 7 MHz or 8 MHz".

Cross-Carrier Scheduling

Cross-carrier scheduling, invoked via RRC signaling, enables the UE to decode PDCCH exclusively on the PCC. PDCCH signaling on PCC is also used to recover resource allocations associated with SCC. Support for cross-carrier scheduling required extending the Downlink Control Information (DCI) formats to include a Carrier Indication Field (CIF). This new field (3-bits) enables the UE to distinguish which component carrier a scheduling decision is intended for. PDSCH-Start is signaled to the UE during activation of cross-carrier signaling to indicate how many OFDM symbols (1-4 depending on signal bandwidth) are reserved at the start of each subframe for control data. This information would be conveyed ordinarily in PCFICH. However, with cross-carrier scheduling, the UE no longer decodes PCFICH on the secondary component carrier.

Synchronization

Periodicity for querying the broadcast network and revising access to available channel spectrum should be synchronized to 1 PPS GPS time. Synchronization of the broadband system is afforded by alignment with respect to LTE frame boundaries, occurring every 10 ms. Similar time alignment can be created on the broadband network side.

Table 7 and FIG. 14

Table 7 below lists a broadband downlink (DL) and uplink (UL) channel assignment. FIG. 14 describes the cell configuration parameters associated with that channel assignment.

TABLE 7

Requested EARFCN: 5230

| Band | Name | Mode | EARFCN DL | Downlink (MHz) | EARFCN UL | Uplink (MHz) |
|---|---|---|---|---|---|---|
| 13 | US 700c Upper | FDD | 5230 | 751.0 | 23230 | 782.0 |

Summary of Proposed DSS Enhancements

[Enh 12]: Leverage unused TV spectrum, i.e. channels deemed available by the broadcast network operator, to boost LTE downlink throughout capacity.

[Enh 13]: Devise a compact encoding used to communicate channel availability, designated (1/0) per channel, per band in a given regulatory domain from the broadcast network operator to the spectrum server.

[Enh 14]: Define new band combinations pairing broadcast channels (presumably by channel number according to the existing numbering scheme) with LTE bands, e.g. CA_52A_13A, indicating interband carrier aggregation, i.e. channel 52 and band 13 (US 700 c Upper), supporting bandwidth class A ($N_{RB,agg} \leq 100$, maximum of 1 CC).

[Enh 15]: Aggregate the available broadcast spectrum into contiguous bands to reduce the number of radio receivers needed at the end user device.

[Enh 16]: Assign the available spectrum in integer multiples of a fixed RB bandwidth, designating the aggregate channel bandwidth according the channel at the aggregated band center.

[Enh 17]: Define a channel numbering scheme that accounts for carrier aggregation from either an odd or even number of the available broadcast channels.

[Enh 18]: Designate the two modes as band center oriented (BCO) corresponding to an odd number of aggregated channels and band edge oriented (BEO) corresponding to an even number of aggregated channels.

[Enh 19]: Determine the number of aggregate RBs as a function of the broadcast channel bandwidth, i.e. 6, 7 or 8 MHz, depending on the regulatory domain.

[Enh 20]: Number the aggregated spectrum up to an even integer multiple of a fixed RB bandwidth.

[Enh 21]: Allocate the available RBs on either side of the band center frequency to avoid signal power in the DC subcarrier of the DL OFDM signal.

[Enh 22]: Limit the number of RBs available in a given aggregate bandwidth to preserve required band edge spacing.

REFERENCES

[1] Mark A. Aitken, Mike Simon, "Exploring Innovative Opportunities in ATSC Broadcasting," ATSC Symposium on Next Generation Broadcast Television, 15 Feb. 2011, Rancho Mirage, Calif.
[2] Mark A. Aitken, "Broadcast Convergence—Bringing efficiency to a new platform," SMPTE 2011 Annual Conference, Oct. 25-27, 2011, Hollywood, Calif.
[3] Mark A. Aitken, "Broadcast—The Technology and the Medium." Sinclair Broadcast Group, 61$^{st}$ Annual IEEE Broadcast Symposium, Alexandria, Va., 19-21 Oct. 2011.
[4] 3GPP TS 36.441, "Layer 1 for interfaces supporting Multimedia Broadcast Multicast Service (MBMS) within E-UTRAN (Release 11)," V.11.0.0, September, 2012.
[5] PD 3606.7630.62, "Carrier aggregation—(one) key enabler for LTE-Advanced," Rohde & Schwarz Technical Article, V.01.01, October, 2012.

Spectrum Server

Figure 15:
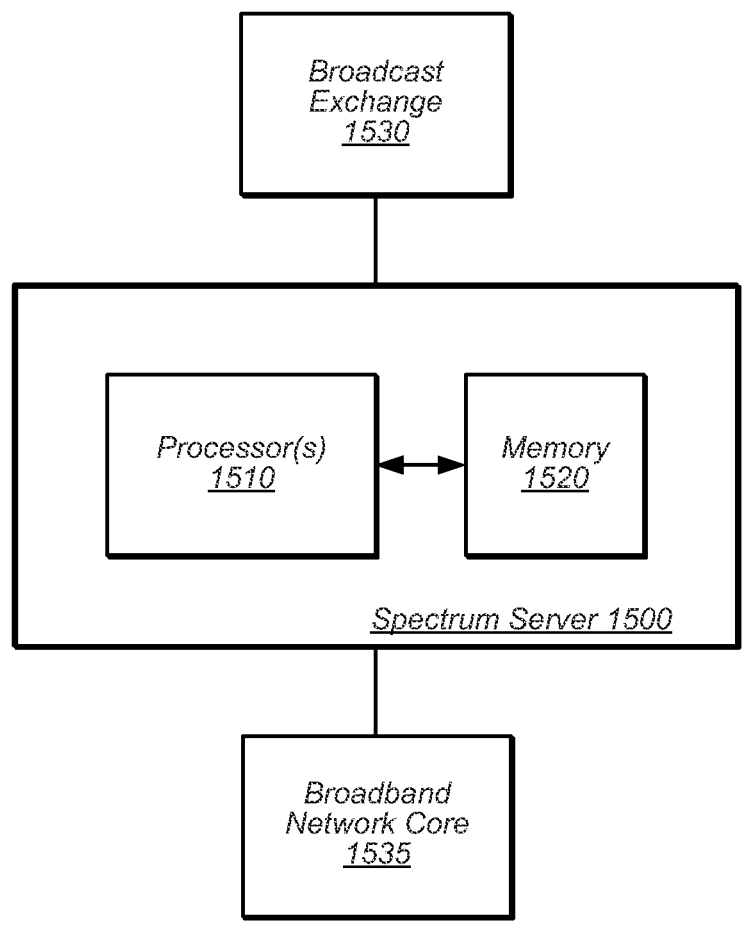
FIG. 15 illustrates one embodiment of a spectrum server for allocating available spectrum resources under carrier aggregation.

In one set of embodiments, a spectrum server 1500 may be configured to include one or more processors 1510 and memory 1520, as shown in FIG. 15. The spectrum server 1500 may be used to allocate available spectrum resources under carrier aggregation. (The spectrum server 1500 may also include any subset of the features, elements and embodiments described above.) The memory stores program instructions, wherein the program instructions, when executed by the one or more processors, cause the one or more processors to perform the operations (a) through (c) as follows.

(a) The processor(s) 1510 may receive information indicating broadcast spectrum (e.g., one or more channels, not necessarily contiguous) made available by one or more broadcast networks.

(b) The processor(s) 1510 may assign at least a portion (perhaps all) of the available broadcast spectrum to a wireless broadband network in response to a request from the wireless broadband network, wherein said assigned at least a portion is defined by an interval of resource block numbers (or by one or more intervals of resource block numbers) according to a partition of the available broadcast spectrum into resource blocks of fixed width.

(c) The processor(s) 1510 may transmit a message to the wireless broadband network, wherein the message identifies the interval of resource block numbers (or, the one or more intervals of resource block numbers).

In some embodiments, the program instructions are configured so that one or more of the following conditions is true:

the resource blocks of said partition are distributed symmetrically with respect to a center of the available broadcast spectrum;

if the one or more resource blocks defining said at least a portion are odd in number, said assigning includes inserting a half-subcarrier shift of those one or more resource blocks, wherein said insertion avoids signal power being allocated to a DC subcarrier when the wireless broadband network generates a downlink signal based on said at least a portion;

the resource blocks of said partition exclude edge portions of the available broadcast spectrum, to avoid interference with transmissions on other bands of radio spectrum.

In another set of embodiments, the program instructions, when executed by the one or more processors, cause the one or more processors to perform the operations (1) through (3) as follows.

(1) The processor(s) 1510 may combine channels of broadcast spectrum made available by one or more broadcast networks to form a contiguous band. See, e.g., the section above entitled "Channel Assignment". In some embodiments, this combining step may be omitted.

(2) The processor(s) 1510 may assign a contiguous portion of the contiguous band to a wireless broadband network in response to a request from the wireless broadband network, wherein the contiguous portion is defined by an interval of resource block numbers according to a partition of the contiguous band into resource blocks of fixed width. The resource blocks of the partition may be consecutively numbered in order of frequency.

(3) The processor(s) 1510 may transmit a message to the wireless broadband network, wherein the message identifies the interval of resource block numbers. For example, the interval $[n_A, n_B]$ of resource block numbers may be identified by its end points $n_A$ and $n_B$. The wireless broadband network is configured to aggregate the assigned contiguous portion with broadband spectrum already belonging to the wireless broadband network when performing downlink transmissions via one or more base stations.

In other embodiments, the processor(s) may assign and transmit one or more portions of a set of available broadcast spectrum, where the one or more portions do not necessarily form a contiguous whole, i.e., there may be gaps between some or all of the portions.

In some embodiments, the program instructions are configured so that one or more of the following conditions is true:

(a) the resource blocks of said partition of the contiguous band are distributed symmetrically with respect to a center of the contiguous band;

(b) if the resource blocks defining said contiguous portion are odd in number, said assigning includes inserting a half-subcarrier shift of those resource blocks, wherein said insertion avoids signal power being allocated to a DC subcarrier when the wireless broadband network generates a downlink OFDM signal based on the contiguous portion;

(c) the resource blocks of said partition of the contiguous band exclude edge portions of the contiguous band, to avoid interference with transmissions on other bands of radio spectrum.

The spectrum server 1500 may be referred to as a "spectrum exchange", and may operate as an intermediary between one or more broadcast networks and one or more wireless broadband networks. The spectrum server may interact with a broadcast exchange 1530 representing the one or more broadcast networks, and with a wireless broadband network core 1535 representing one or more broadband networks. (In the context of LTE, the broadband core network 1535 may be an Evolved Packet Core (EPC). In alternative embodiments, the spectrum server 1500 may be part of a broadcast network or part of a broadband network.

The spectrum server 1500 may receive messages from the broadcast exchange 1530 indicating portions of available broadcast spectrum, i.e., portions of spectrum one or more broadcast networks are willing to make available (and not use themselves) at least for a period of time and at least in some geographical region. The spectrum server adds information identifying the one or more portions to its database of available broadcast spectrum resources. The spectrum server 1500 also may receive messages from the broadband network core 1535 requesting access to portions of available broadcast spectrum.

In some embodiments, the program instructions, when executed by the one or more processors, cause the one or more processors to perform one or more of the following operations, denoted A through G.

A. The processor(s) 1510 may combine the available broadcast spectrum into contiguous bands. (For example, the spectrum server may sense that certain broadcast channels made available by the broadcast exchange can be joined to form a contiguous band equal to the union of the channels.) The action of combining available broadcast spectrum may account for the likelihood that a user device, associated with a particular secondary cell, has a limited number of radio receivers to support carrier aggregation. (As used herein, the term "secondary cell" means any configured carrier other than the serving carrier where the user device gets its system information.)

B. The processor(s) may assign the available spectrum to the broadband network core in integer multiples of a fixed resource block (RB) bandwidth. (In some embodiments, the aggregate channel bandwidth may be designated according to the channel at the aggregated band center.) Information identifying the assignment may be transmitted to the broadband network. The assignment and transmission may occur in response a request from the broadband network.

C. The processor(s) may employ a channel numbering scheme that accounts for carrier aggregation from either an odd or even number of the available broadcast channels. See the section above entitled "Channel Assignment".

D. The processor(s) may employ the above two modes, with the first mode being band center oriented (BCO), corresponding to an odd number of aggregated channels, and the second mode being band edge oriented (BEO), corresponding to an even number of aggregated channels.

E. The processor(s) may determine the number of aggregate RBs as a function of the broadcast channel bandwidth (e.g. allocated in multiples of 6, 7 or 8 MHz, depending on the regulatory domain).

F. The processor(s) may number the aggregated spectrum up to an even integer multiple of a fixed RB bandwidth, and allocate the available RBs on either side of the band center frequency to avoid signal power in the DC subcarrier of the DL OFDM signal.

G. The processor(s) may limit the number of RBs available in a given aggregate bandwidth to preserve required band edge spacing, where the number of RBs allocated on either side of the aggregated band center is determined, e.g., by the number of available channels (N) times the signal bandwidth (per regulatory domain) less the spacing required at the band edge divided by the fixed RB bandwidth.

Figure 16:
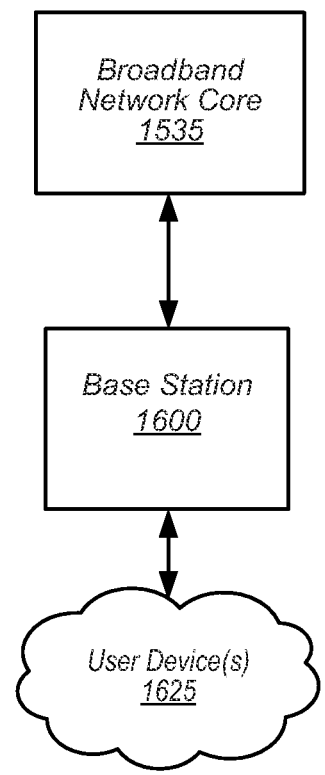
FIG. 16 illustrates one embodiment of a base station for use in connection with a method for dynamically aggregating available spectrum resources.
Figure 17:
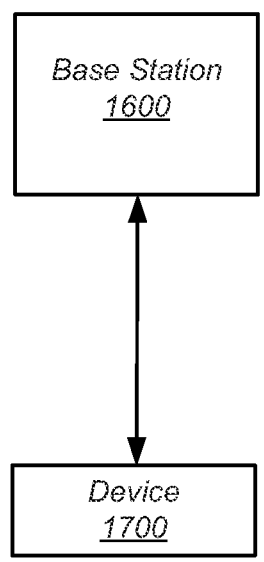
FIG. 17 illustrates one embodiment of a device for use in association with a method for dynamically aggregating available spectrum resources.

In one set of embodiments, a base station 1600 may wirelessly communicate with one or more user devices 1625, as shown in FIG. 16. (The base station 1600 may include any subset of the features, elements and embodiments described above.) The base station 1600 may be configured for operation as part of a wireless broadband network, enabling dynamic aggregation of spectrum resources.

The base station 1600 may include circuitry configured to wirelessly transmit a downlink signal (e.g., OFDM signal) to one or more devices using aggregated spectrum resources including a portion of broadband spectrum and a portion of broadcast spectrum. The portion of broadcast spectrum has been made available by one or more broadcast networks and dynamically assigned to the wireless broadband network by a spectrum server, e.g., as variously described above. The portion of broadcast spectrum may be specified by the spectrum server as an interval of resource block numbers (or, as one or more intervals of resource block numbers) according to a partition of a contiguous band of the broadcast spectrum into resource blocks of fixed width, e.g., as variously described above. In some embodiments, the portion of broadcast spectrum is a contiguous portion.

In some embodiments, if the one or more resource blocks defining said portion of broadcast spectrum are odd in number, said circuitry is configured to insert a half-subcarrier shift of those one or more resource blocks, wherein said insertion avoids signal power being allocated to a DC subcarrier of the downlink signal.

In some embodiments, the resource blocks of said partition exclude edge portions of the contiguous band, to avoid interference with transmissions on other bands of radio spectrum.

In some embodiments, the base station may receive information from the broadband network core 1535 indicating spectrum resources that the base station may use to wirelessly communicate with the user device(s) 1625. As described above, those spectrum resources may include broadcast spectrum resources allocated by the spectrum server.

In some embodiment, the circuitry is configured to wirelessly communicate (transmit and/or receive signals) with the one or more user devices 1635 (e.g., mobile devices and/or non-mobile devices) in accordance with a system that performs one or more the following:

(a) combine the available broadcast spectrum into contiguous bands;

(b) assigns the available spectrum in integer multiples of a fixed resource block (RB) bandwidth, designating the aggregate channel bandwidth according to the channel at the aggregated band center;

(c) employs a channel numbering scheme that accounts for carrier aggregation from either an odd or even number of the available broadcast channels;

(d) employs the two above modes, with the first mode being band center oriented (BCO), corresponding to an odd number of aggregated channels, and the second mode being band edge oriented (BEO), corresponding to an even number of aggregated channels;

(e) determines the number of aggregate RBs as a function of the broadcast channel bandwidth (e.g., allocated in multiples of 6, 7 or 8 MHz, depending on the regulatory domain);

(f) numbers the aggregated spectrum up to an even integer multiple of a fixed RB bandwidth, and allocate the available RBs on either side of the band center frequency to avoid signal power in the DC subcarrier of the DL OFDM signal;

(g) limits the number of RBs available in a given aggregate bandwidth to preserve required band edge spacing, where the number of RBs allocated on either side of the aggregated band center is determined, e.g., by the number of available channels (N) times the signal bandwidth (per regulatory domain) less the spacing required at the band edge divided by the fixed RB bandwidth.

In some embodiments, the circuitry includes one or more RF transceivers, one or more baseband processors, and one or more control processors.

In one set of embodiments, a device 1700 (e.g., a mobile device or non-mobile device) may be configured to enable dynamic aggregation of spectrum resources. The device may include circuitry configured to wirelessly communicate with one or more base stations (such as base station 1600) associated with a wireless broadband network. (The device 1700 may also include any subset of the features, elements and embodiments described above.)

The circuitry may be configured to receive a downlink signal (e.g., OFDM signal) transmitted by a first of the one or more base stations, where the downlink signal uses aggregated spectrum resources including a portion of broadband spectrum and a portion of broadcast spectrum. The portion of broadcast spectrum has been made available by one or more broadcast networks and dynamically assigned to the wireless broadband network by a spectrum server. The portion of broadcast spectrum is specified by the spectrum server as an interval of resource block numbers (or, as one or more intervals of resource block numbers) according to a partition of a contiguous band of the broadcast spectrum into resource blocks of fixed width. In some embodiments, the portion of broadcast spectrum is a contiguous portion.

In some embodiments, if the resource blocks defining said portion of broadcast spectrum are odd in number, the circuitry is configured to insert a half-subcarrier shift of those resource blocks, wherein said insertion avoids signal power being allocated to a DC subcarrier of the downlink signal.

In some embodiment, the circuitry may be configured to wirelessly communicate (receive and/or transmit) with one or more base stations in accordance with a system that performs one or more of the following:

(a) combines the available broadcast spectrum into contiguous bands;

(b) assigns the available spectrum in integer multiples of a fixed resource block (RB) bandwidth, designating the aggregate channel bandwidth according to the channel at the aggregated band center;

(c) employs a channel numbering scheme that accounts for carrier aggregation from either an odd or even number of the available broadcast channels;

(d) employs the above two modes, with the first mode being band center oriented (BCO), corresponding to an odd number of aggregated channels, and the second mode being band edge oriented (BEO), corresponding to an even number of aggregated channels;

(e) determines the number of aggregate RBs as a function of the broadcast channel bandwidth (e.g. allocated in multiples of 6, 7 or 8 MHz, depending on the regulatory domain);

(f) numbers the aggregated spectrum up to an even integer multiple of a fixed RB bandwidth, and allocate the available RBs on either side of the band center frequency to avoid signal power in the DC subcarrier of the DL OFDM signal;

(g) limits the number of RBs available in a given aggregate bandwidth to preserve required band edge spacing, where the number of RBs allocated on either side of the aggregated band center is determined, e.g., by the number of available channels (N) times the signal bandwidth (per regulatory domain) less the spacing required at the band edge divided by the fixed RB bandwidth.

In some embodiment, the circuitry includes one or more RF transceivers, one or more baseband processors, and one or more control processors.

Base Station for Dynamic Carrier Aggregation

Figure 18:
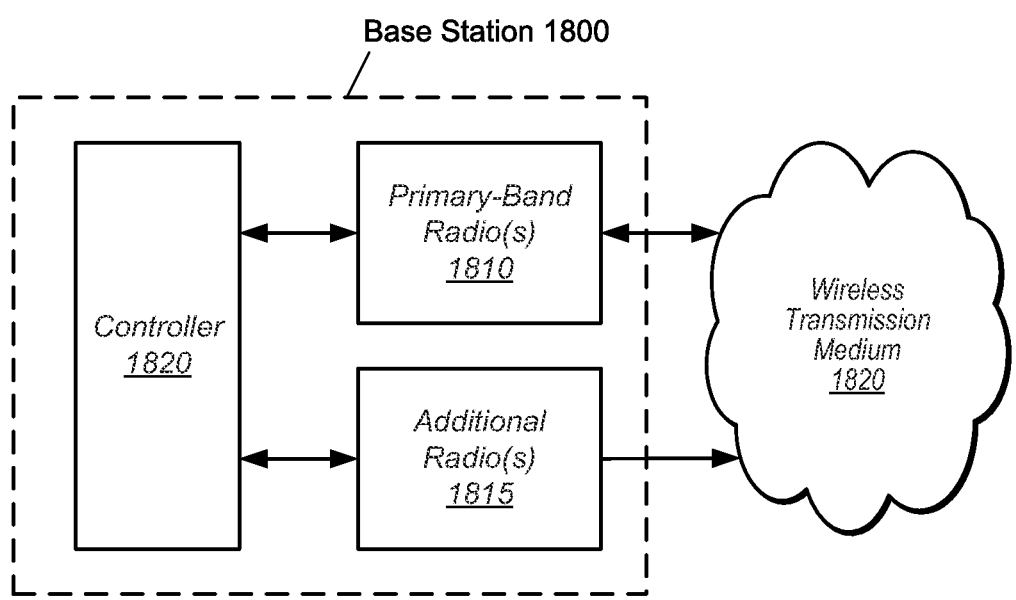
FIG. 18 illustrates one embodiment of a base station for dynamic carrier aggregation.

In one set of embodiments, a base station 1800 for use as part of a wireless broadband network may include one or more primary-band (PB) radios 1810, one or more additional radios 1815 and a controller 1820, as shown in FIG. 18. (The base station 1800 may also include any subset of the features, elements and embodiments described above.) The base station is configured to communicate with wireless devices via wireless transmission medium 1820.

Each of the one or more PB radios 1810 is configured to transmit at least over a respective one of one or more primary bands (e.g., one or more bands owned by a wireless broadband carrier). Furthermore, each of the one or more additional radios 1815 has a carrier frequency that is dynamically tunable or programmable to any of multiple frequency bands within the radio spectrum.

The controller 1820 configured to: (a) receive information identifying a first dynamically-allocated spectrum resource; (b) tune or program a first of the one or more additional radios to a first carrier frequency corresponding to the first dynamically-allocated spectrum resource; (c) receive a data stream from an infrastructure network; (d) divide the data stream into a first set of substreams; and (d) direct a parallel transmission of the substreams of the first set using respectively the one or more PB radios and the first additional radio. The one or more PB radios may transmit over the one or more primary bands while the first additional radio transmits over the first dynamically-allocated spectrum resource.

In some embodiments, each of the PB radios has a carrier frequency that is dynamically tunable or programmable to any of multiple frequency bands.

In some embodiments, at least one of the PB radios has a carrier frequency that is dynamically tunable or programmable to any of the multiple frequency bands.

In some embodiments, the multiple frequency bands include the one or more primary bands and one or more additional bands.

In some embodiments, the one or more additional radios comprise a plurality of additional radios, wherein the controller is further configured to: (1) tune or program each of the additional radios to a respective carrier frequency corresponding to a respective dynamically-allocated spectrum resource; (2) divide the data stream into a second set of substreams; and (3) direct the parallel transmission of the substreams of the second set using respectively the one or more PB radios and the additional radios.

In some embodiments, the controller is further configured to: receive information identifying a second dynamically-allocated spectrum resource; tune or program a second of the additional radios to a second carrier frequency corresponding to the second dynamically-allocated spectrum resource; divide the data stream into a second set of substreams; and direct the parallel transmission of the substreams of the second set using respectively the one or more PB radios and the first and second additional radios.

In some embodiments, the information identifying the first dynamically-allocated spectrum resource includes: information indicating the first carrier frequency of the first dynamically-allocated spectrum resource, and information indicating a first period of time over which the first dynamically-allocated spectrum resource has been allocated to the base station.

In some embodiments, the controller is configured to generate OFDM symbol streams based respectively on the data substreams, where said parallel transmission includes parallel transmission of the OFDM symbols streams using respectively the one or more PB radios and the first additional radio.

In some embodiments, the controller is configured to generate symbol streams based respectively on the data substreams, wherein the controller is configured to generate symbols of the symbol streams with a value of cyclic prefix (CP) length that is programmably-selected from a plurality of CP length options.

In some embodiments, the controller is configured to provide additional scaling in OFDM subcarrier spacing to increase symbol duration for a fixed signal bandwidth (e.g., additional scaling as compared to the scaling already required by an existing wireless communication standard such as LTE).

In some embodiments, the controller is configured to schedule paging and other signaling in subframes (SFs) that carry primary and secondary sync (e.g., to increase the number of SFs available for eMBMS).

In some embodiments, the controller is configured use the system configuration advertised on MIB/SIB in order to instruct user devices to confine their use of paging and other control signaling.

In some embodiments, the controller is configured to vary one or more available system parameters (e.g., parameters such as CP length and subcarrier spacing) as a function of a prescribed eMBMS SF allocation (e.g., permitting the use of 6 or 8 or other out of 10 SFs per frame while retaining full use of extensibility in system parameters affecting delay spread tolerance).

In some embodiments, the controller is configured to employ Hybrid Automatic Repeat reQuest (HARQ) retransmissions in place of bit interleaving or symbol interleaving (e.g., to improve burst noise immunity without compromising low latency requirements set forth for LTE).

In some embodiments, the controller is configured to employ a modified version of HARQ, to enable automatic (i.e. prescheduled) retransmission providing incremental redundancy when operating broadcast services in Un-Acknowledged Mode (UAM).

In some embodiments, the controller is configured to perform modulation using modulation orders that are higher than an existing LTE standard (e.g., 256-QAM over existing 64-QAM) in order to increase maximum system capacity.

In some embodiments, the controller is configured to employ multiple antenna techniques for one or more or all of the transmission modes supported in eMBMS (e.g., to improve RX SINR and/or downlink throughput, maximizing system capacity).

In some embodiments, the first dynamically-allocated spectrum resource is specified in terms of one or more resources blocks conforming to a resource block structure of fixed length in the frequency domain.

In some embodiments, the controller is configured to operate with bandwidth definitions that are extended as compared to existing bandwidth definitions for wireless broadband communication, wherein the extended bandwidth definitions more fully occupy 6/7/8 MHz broadcast channel bandwidths.

Device for Dynamic Carrier Aggregation

Figure 19:
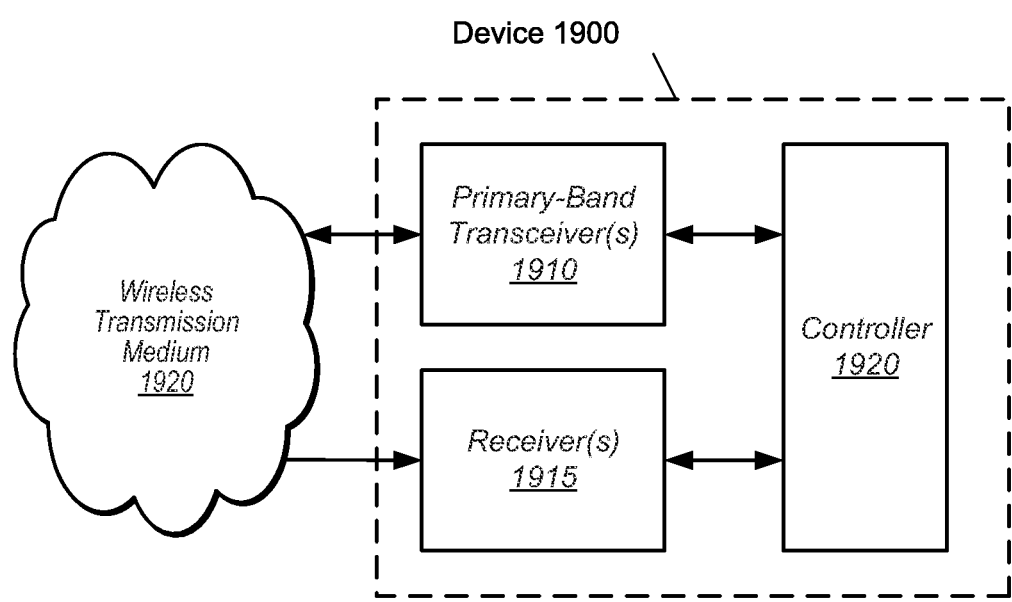
FIG. 19 illustrates one embodiment of a device for dynamic carrier aggregation.
Figure 20:
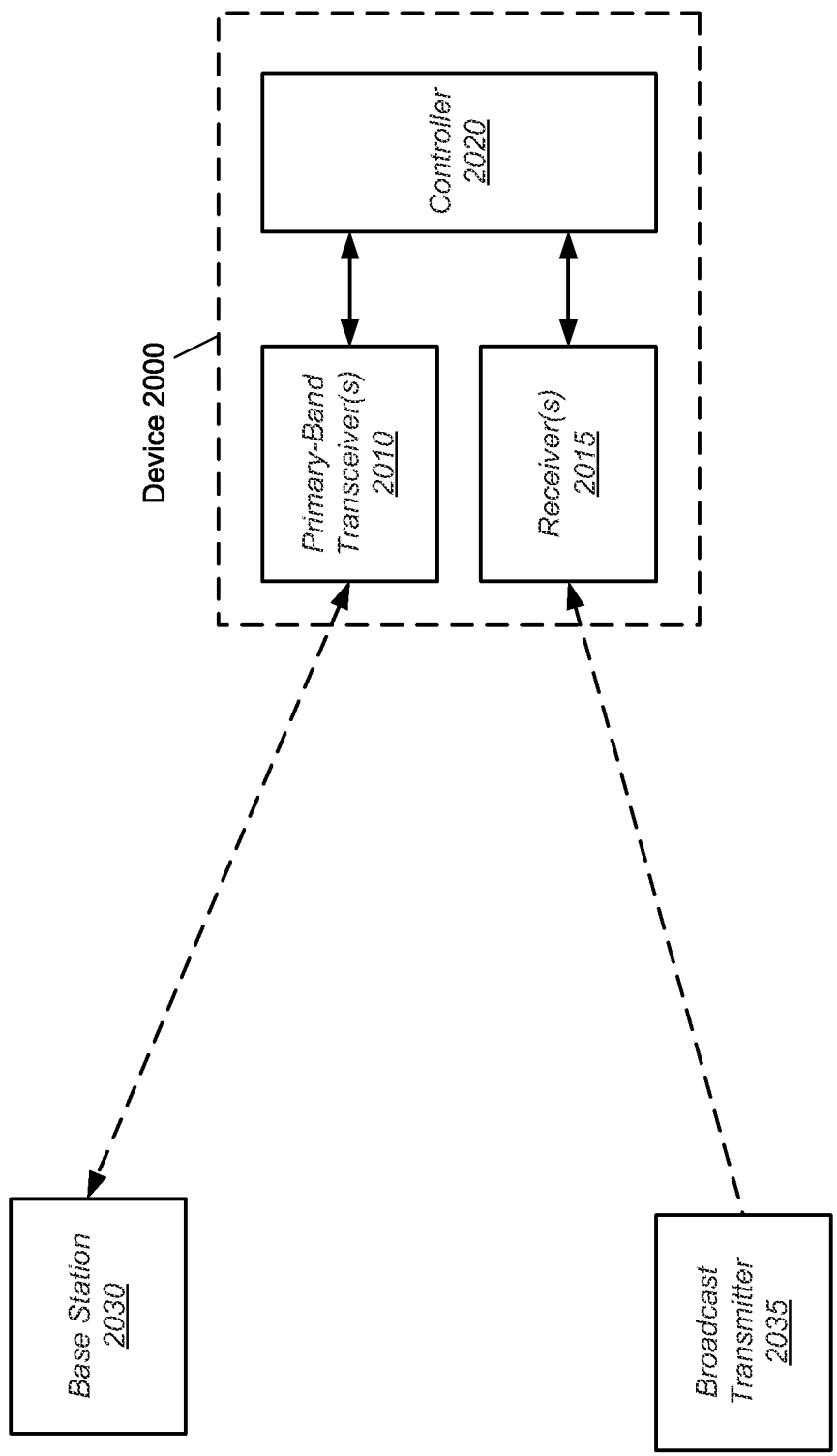
FIG. 20 illustrates one embodiment of a device for spectrum sharing using broadcast infrastructure.

In one set of embodiments, a device 1900 may include one or more primary-band transceivers 1910, one or more receivers 1915 and a controller 1920, as shown in FIG. 19. (The device 1900 may also include any subset of the features, elements and embodiments described above.) The device 1900 is configured to communicate via wireless transmission medium 1920.

Each of the one or more PB transceivers 1910 is configured to wirelessly communicate with a base station of the wireless broadband network using a respective one of one or more primary bands within a radio spectrum. Furthermore, each of the one or more receivers 1915 has a carrier frequency that is dynamically tunable or programmable to any of multiple frequency bands within the radio spectrum.

The controller 1920 is configured to: (a) receive one or more network data streams from a base station of the wireless broadband network using the one or more PB transceivers; (b) tune or program a first of the one or more receivers to a carrier frequency corresponding to a first currently-available spectrum resource of the radio spectrum in response to receiving a first message from the base station, wherein the first message identifies the first currently-available spectrum resource; (c) receive a first additional network data stream from the base station using the first receiver after having tuned or programmed the first receiver, and (d) combine the one or more network data streams and the first additional network data stream to obtain an aggregate data stream. The first receiver may receive the first additional network data stream over the first currently-available spectrum resource while the one or more PB transceivers 1910 receive the one or more network data streams over the one or more primary bands.

In some embodiments, the device is a mobile device.

In some embodiments, the device is a fixed device (e.g., a television).

In some embodiments, one or more broadcast transmitters in a geographical neighborhood of the base station are controlled by a broadcast exchange, wherein the broadcast exchange has agreed not to broadcast using the first currently-available spectrum resource in the geographical neighborhood of the base station over a specified period of time.

In some embodiments, one or more broadcast transmitters in a geographical neighborhood of the base station are controlled by an individual broadcaster, wherein the individual broadcaster has agreed not to broadcast using the first currently-available spectrum resource in the geographical neighborhood of the base station over a specified period of time.

In some embodiments, the one or more PB radios and the one or more additional radios each conform to a common hardware design, wherein each of the one or more PB radios is programmed so that it is allowed to operate in the respective primary band.

In some embodiments, the controller is further configured to supply the aggregate data stream to an application executing on the device.

In some embodiments, the multiple frequency bands include at least the VHF band and the UHF band.

In some embodiments, the one or more receivers comprise a plurality of receivers, wherein the controller is further configured to: (1) tune or program each of the receivers to a respective carrier frequency corresponding to a respective currently-available spectrum resource in response to receiving a respective message from the base station, wherein the respective message identifies the respective currently-available spectrum resource; (2) for each of the receivers, receive a respective additional network data stream from the base station using the respective receiver; and (3) combine the one or more network data streams and the additional network data streams to obtain a second aggregate data stream.

In some embodiments, the controller is further configured to: tune or program a second of the receivers to a carrier frequency corresponding to a second currently-available spectrum resource of the radio spectrum in response to receiving a second message from the base station, wherein the second message identifies the second currently-available spectrum resource; and receive a second additional network data stream from the base station using the second receiver after having tuned or programmed the second receiver.

In some embodiments, the first message identifying the first currently-available spectrum resource is received from the base station using at least one of the one or more PB transceivers.

In some embodiments, the first message includes: information indicating the carrier frequency of the first dynamically-allocated spectrum resource, and information indicating of a first period of time over which the first dynamically-allocated spectrum resource has been allocated for use by the mobile station or the base station.

In some embodiments, the controller is configured to extract data from symbols from a symbol stream using a value of cyclic prefix (CP) length that is programmably-selected from a plurality of CP length options, wherein the symbol stream is acquired by the first receiver.

In some embodiments, the controller is configured to provide additional scaling in OFDM subcarrier spacing (e.g., additional scaling as compared to the scaling already required by an existing wireless communication standard such as LTE).

In some embodiments, the controller is configured to vary one or more available system parameters (e.g., parameters such as CP length and subcarrier spacing) as a function of a prescribed eMBMS subframe allocation.

In some embodiments, the controller is configured to employ Hybrid Automatic Repeat reQuest (HARQ) retransmissions in place of bit interleaving or symbol interleaving (e.g., to improve burst noise immunity without compromising low latency requirements set forth for LTE).

In some embodiments, the controller is configured to employ a modified version of HARQ, to enable automatic (i.e. prescheduled) retransmission, providing incremental redundancy when broadcast services are operated in Un-Acknowledged Mode (UAM).

In some embodiments, the controller is configured to perform demodulation using constellation orders that are higher than an existing LTE standard (e.g., 256-QAM over existing 64-QAM) in order to increase maximum system capacity.

In some embodiments, the controller is configured to employ multiple antenna techniques for one or more or all of the transmission modes supported in eMBMS (e.g., to improve RX SINR and/or downlink throughput, maximizing system capacity).

In some embodiments, the first dynamically-allocated spectrum resource is specified in terms of one or more resources blocks conforming to a resource block structure of fixed length in the frequency domain.

In some embodiments, the controller is configured to operate with bandwidth definitions that are extended as compared to existing bandwidth definitions for wireless broadband communication, wherein the extended bandwidth definitions more fully occupy 6/7/8 MHz broadcast channel bandwidths.

Device—Spectrum Sharing Using Broadcast Infrastructure

In one set of embodiments, a device 2000 may include one or more primary-band transceivers 2010, one or more receivers 2015 and a controller 2020. (The device 2000 may also include any subset of the features, elements and embodiments described above.) The device 2000 may operate as part of a wireless broadband network and simultaneously operate to receive one or more broadcast signals transmitted by a broadcast network including one or more broadcast transmitters.

Each of the one or more PB transceivers 2010 is configured to wirelessly communicate with a base station of the wireless broadband network using a respective one of one or more primary bands within a radio spectrum. Furthermore, each of the one or more receivers 2015 has a carrier frequency that is dynamically tunable or programmable to any of multiple frequency bands within the radio spectrum.

The controller may be configured to: (a) receive one or more network data streams from a base station 2030 of the wireless broadband network using the one or more PB transceivers 2010; (b) tune or program a first of the one or more receivers 2015 to a first broadcast frequency corresponding to a first broadcast signal transmitted by a first of the broadcast transmitters (e.g., by broadcast transmitter 2035); and (c) in response to said tuning or programming, recover a first broadcast data stream from the first broadcast signal using the first receiver, wherein the first broadcast data stream comprises data that has been off-loaded by the wireless broadband network to the broadcast network for broadcast via at least one of the one or more broadcast transmitters (e.g., via the first broadcast transmitter 2035). In some embodiments, the first receiver may receive the first broadcast signal while the one or more PB transceivers 2919 receive the one or more network data streams over the one or more primary bands.

In some embodiments, the device is a mobile device.

In some embodiments, the device is a fixed device (e.g., a television).

In some embodiments, the controller is configured to provide the one or more network data streams and the first broadcast data stream to one or more applications executing on the device.

In some embodiments, the controller is further configured to display a video signal via a display device (e.g., a display device that is incorporated in the device or coupled to the device), wherein the video signal is generated from the first broadcast data stream.

In some embodiments, the broadcast network dynamically controls the allocation of broadcast content streams to spectrum resources for broadcast via the one or more broadcast transmitters.

In some embodiments, the controller is configured to tune or program the first receiver to the first broadcast frequency in response to user input selecting a particular content item from a displayed content guide.

In some embodiments, the controller is configured to: collect statistics on a user's viewing of content provided via the broadcast transmitters; and transmit the statistics to the wireless network.

In some embodiments, said transmission of the statistics is performed using the one or more PB transceivers. In some embodiments, said transmission of the statistics is performed using a WiFi transmitter (that is included as part of the device or coupled to the device). In some embodiments, said transmission of the statistics is performing using a radio configured to transmit over unlicensed radio spectrum.

In some embodiments, the controller is configured to: perform said receiving of the one or more network data streams using OFDM; and perform said recovering of the first broadcast data stream using OFDM.

Method for Operating a Spectrum Server

In one set of embodiments, a method 2100 for operating a spectrum server may include the operations shown in FIG. 21. (The method 2100 may also include any subset of the features, elements and embodiments described above.) The method may be performed to facilitate the sale of available spectrum resources to wireless broadband providers. The method may be performed by a processor (or by a set of one or more processors) of the spectrum server, in response to the execution of stored program instructions. The sale may occur in any of a variety of forms, e.g., dynamic, pre-negotiated, or pre-arranged. For example, an auction counts as a form a sale.

At 2110, the processor may receive a request for the purchase or use of a spectrum resource, wherein the request is received from a wireless broadband provider (e.g., via a computer network) or an entity representing the wireless broadband provider.

At 2115, the processor may identify a particular spectrum resource in a list of spectrum resources that are not currently being used by a broadcast network, wherein the broadcast network dynamically controls the allocation of broadcast content streams to spectrum resources for transmission via a plurality of broadcast transmitters. For example, the processor may access memory to obtain information from the list.

At 2125, the processor may transmit (e.g., via the computer network) information authorizing the wireless broadband provider to use (e.g., to transmit and/or receive on) the particular spectrum resource.

The spectrum server may include network interface hardware to interface with one or more networks, to facilitate communication with the wireless broadband provider.

In some embodiments, the method may also include receiving payment, the promise of payment, or other consideration from the wireless broadband provider. This step may occur in any order relative to the above-described steps 2110, 2115 and 2125. Indeed, payment may occur after (e.g., long after) those steps have been completed. In some embodiments, some form of exchange may be performed between the broadcaster(s) and the wireless broadband network, e.g., instead of payment or in addition to payment.

In some embodiments, the method 2100 may also include removing the particular spectrum resource from the list, e.g., in response to said receiving payment or promise of payment. Alternatively, the list may be updated to indicate the particular spectrum resource has been sold or allocated to the wireless broadband provider, e.g., for a period of time.

In some embodiments, for each of the spectrum resources on the list, the list includes an indication of a period of time over which the broadcast network agrees not to use the spectrum resource.

In some embodiments, for each of the spectrum resources on the list, the list includes an indication of a geographical location of one of the broadcast transmitters through which the broadcast network agrees not to transmit on the spectrum resource.

In some embodiments, the method 2100 may also include: purchasing a block of available spectrum resources from the broadcast network; and adding the available spectrum resources to the list.

In some embodiments, in response to said transmitting authorizing information, the wireless broadband provider is configured to instruct one or more base stations to start transmitting wirelessly on the particular spectrum resource.

In some embodiments, the spectrum server is configured to perform one or more of the following: (a) aggregate the available broadcast spectrum into contiguous bands (e.g., to account for the likelihood that a user device, associated with a particular secondary cell, has a limited number of radio receivers to support carrier aggregation); (b) assign the available spectrum in integer multiples of a fixed resource block (RB) bandwidth, designating the aggregate channel bandwidth according to the channel at the aggregated band center, (c) employ a channel numbering scheme that accounts for carrier aggregation from either an odd or even number of the available broadcast channels; (d) employ the two modes, with the first mode being band center oriented (BCO), corresponding to an odd number of aggregated channels, and the second mode being band edge oriented (BEO), corresponding to an even number of aggregated channels; (e) determine the number of aggregate RBs as a function of the broadcast channel bandwidth (e.g. allocated in multiples of 6, 7 or 8 MHz, depending on the regulatory domain); (f) number the aggregated spectrum up to an even integer multiple of a fixed RB bandwidth, and allocate the available RBs on either side of the band center frequency to avoid signal power in the DC subcarrier of the DL OFDM signal; (g) limit the number of RBs available in a given aggregate bandwidth to preserve required band edge spacing, where the number of RBs allocated on either side of the aggregated band center is determined, e.g., by the number of available channels (N) times the signal bandwidth (per regulatory domain) less the spacing required at the band edge divided by the fixed RB bandwidth.

Dynamic Spectrum Purchase Server for Wireless Network

Figure 22:
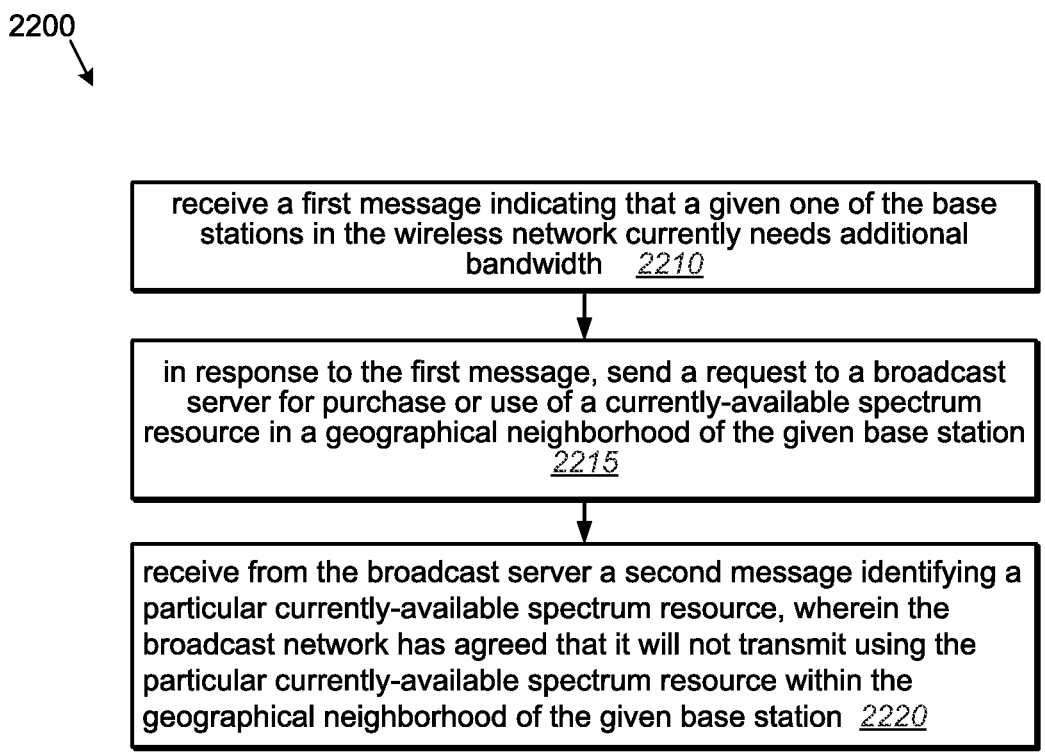
FIG. 22 illustrates one embodiment of a spectrum purchase server for a wireless network.

In one set of embodiments, a method 2200 may include the operations shown in FIG. 22. (The method 2200 may also include any subset of the features, elements and embodiments described above.) The method may be employed to operate a server as part of a wireless broadband network, in order to facilitate the purchase (e.g., the dynamic purchase) of spectrum resources. Base stations of the wireless broadband network may operate in the same geographical region as a broadcast network including a set of broadcast transmitters. The method 2200 may be performed by a processor (or a set of one or more processors) operating in response to the execution of stored program instructions. The purchase may occur in any of a variety of forms, e.g., dynamic, pre-negotiated, or pre-arranged.

At 2210, the processor may receive a first message indicating that a given one of the base stations in the wireless network currently needs additional bandwidth.

At 2215, in response to receiving the first message, the processor may send a request to a broadcast server (e.g., the above-described spectrum server 1500) for purchase or use of a currently-available spectrum resource in a geographical neighborhood of the given base station.

At 2220, the processor may receive from the broadcast server a second message identifying a particular currently-available spectrum resource, wherein the broadcast network has agreed that it will not transmit using the particular currently-available spectrum resource within the geographical neighborhood of the given base station.

In some embodiments, the method 2200 may also include sending information indicating payment or a promise of payment or other consideration to the broadcast server for use of the particular currently-available spectrum resource.

In some embodiments, the method 2200 may also include sending a third message to the given base station, wherein the third message identifies the particular currently-available spectrum resource and enables the given base station to start transmitting using the particular currently-available spectrum resource.

In some embodiments, the first message is received from a load control server that monitors the state of loading of base stations with the broadband wireless network.

In some embodiments, the request sent to a broadcast server includes an indication of the location of the given base station.

In some embodiments, the second message received from the broadcast server includes: information indicating a frequency range occupied by the particular currently-available spectrum resource; and information indicating a time period over which the broadcast network has agreed not to transmit within the geographical neighborhood of the given base station.

Method for Operating an Advertising Server as Part of a Wireless Network

In one set of embodiments, a method 2300 may involve the operations shown in FIG. 23. (The method 2300 may also include any subset of the features, elements and embodiments described above.) The method 2300 may be used to operate an advertising server as part of a wireless network, in order to provide targeted advertising to a device, where the device is configured for communication with a wireless broadband network and for reception from broadcast transmitters of a broadcast network. The method may be performed by a processor (or a set of one or more processors) in response to the execution of stored program instructions.

At 2310, the processor may receive viewing information from the device, wherein the viewing information characterizes behavior of a user of the device in viewing broadcast content through one or more of the broadcast transmitters.

In some embodiments, the processor may add the viewing information to a user-specific record stored in a memory medium.

At 2320, the processor may select advertising for the user of the device based on the viewing information (or, based on a current state of the user-specific record).

At 2325, the processor may transmit (or direct the transmission of) a content stream corresponding to the selected advertising to the device via a currently-serving base station of the wireless network.

In some embodiments, the device is a mobile device.

In some embodiments, the device is non-mobile (e.g., a television).

In some embodiments, the method may also include receiving viewer information (e.g., location of the device, activities performed by the user, browsing history of the user, social media info, or sensor data, etc.) from the device. The selection step (b) may be performed based on the viewer information and/or the above-described viewing information.

In some embodiments, the device transmits the viewing information to the advertising server using a currently-serving base station of the wireless network.

In some embodiments, the device transmits the viewing information to the advertising server using a WiFi connection between the device and a WiFi access point.

In some embodiments, the device transmits the viewing information to the advertising server using a transmission over unlicensed spectrum (e.g., WiFi or white space).

In some embodiments, the viewing information includes one or more of: (1) an indication of a broadcast content item currently being viewed by the user of the device; (2) a title of a broadcast content item currently being viewed by the user of the device; (3) a duration of viewing of a broadcast content item that has been broadcast by the broadcast network; (4) a list of broadcast content items viewed by the user of the device.

In some embodiments, the user-specific record includes descriptive information (e.g., age, sex, categories of interest, educational background, income range, etc.) corresponding to the user of the device.

In some embodiments, the action of selecting advertising for the user is based on a predetermined optimal mapping between user characterizing information and advertising content items. The optimal mapping may be determined, e.g., based on statistical optimization techniques using feedback information on actual user purchases.

In some embodiments, the method 2300 may also include: receiving a request for purchase of user-specific viewing information via a network (e.g., the Internet); transmitting data from one or more of user-specific records stored in a memory medium to the requesting entity; and receiving payment or promise of payment or other consideration from the requesting entity for purchase of the user-specific viewing information.

In some embodiments, the method 2300 may also include: receiving a request for purchase of right to advertise to the user of the device (e.g., from an entity that has previously purchased user-specific viewing information, and concluded that it would be worth advertising directly to the user); receiving payment or promise of payment from the requesting entity for purchase of the right to advertise; receiving an advertising content stream from the requesting entity; and transmitting the advertising content stream to the device via the currently-serving base station of the wireless network.

Receiver System for Receiving Broadcast TV Signals

Figure 24:
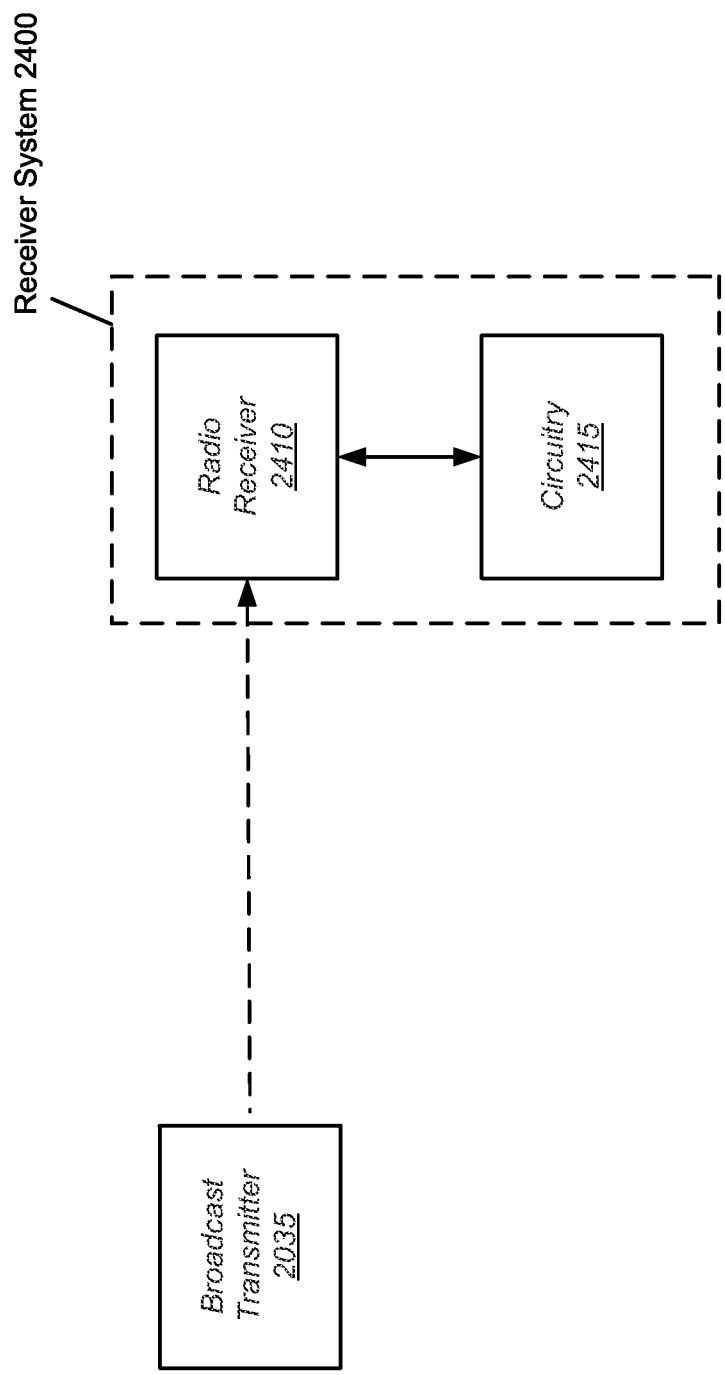
FIG. 24 illustrates one embodiment of a receiver system for receiving broadcast TV signals.

In one set of embodiments, a receiver system 2400 for receiving broadcast TV signals may include a radio receiver 2410 and circuitry 2415, as shown in FIG. 24. (The receiver system 2400 may also include any subset of the features, elements and embodiments described above.)

The radio receiver 2410 is tunable or programmable to any of multiple frequency bands. Moreover, the radio receiver is configured to receive a broadcast signal that is broadcasted by a transmitter.

The circuitry 2415 is configured to recover a video data stream from the received broadcast signal. The circuitry is further configured to support one or more of the features (A) through (K) described below.

(A) The circuitry 2415 may extract data from OFDM symbols using a cyclic prefix (CP) length that is selected from multiple candidate CP lengths, to minimize overhead in achieving increased delay spread tolerance, where the CP length is signaled by the base station using extended MIB/SIB parameter sets.

(B) The circuitry 2415 may employ additional scaling in subcarrier spacing to increase symbol duration for a fixed signal bandwidth, where the additional scaling is signaled by the base station using extended MIB/SIB parameter sets.

(C) The circuitry 2415 may respond to extended DL and UL control channel signaling to accommodate additional CP lengths.

(D) The circuitry 2415 may respond to extended DL and UL control channel signaling to accommodate additional range in subcarrier spacing.

(E) The circuitry 2415 may monitor paging and other signaling in the subframes (SFs) that carry primary and secondary sync in response to a revised system configuration advertised by the base station on the MIB/SIB, wherein the revised system configuration instructs user devices to confine their use of paging and other control signaling to said subframes, thus increasing the number of SFs available for eMBMS.

(F) The circuitry 2415 may determine the set of available system parameters (e.g., CP length and subcarrier spacing) based on the prescribed eMBMS SF allocation as signaled by the base station.

(G) The circuitry 2415 may accept Hybrid Automatic Repeat reQuest (HARQ) retransmissions in place of bit/symbol interleaving to improve burst noise immunity without compromising low latency requirements set forth for LTE.

(H) The circuitry 2415 may accept automatic (i.e. prescheduled) retransmission, providing incremental redundancy when operating broadcast services in Un-Acknowledged Mode (UAM).

(I) The circuitry 2415 may enable demodulation using higher order constellation (than required by an existing standard) for increased maximum system capacity.

(J) The circuitry 2415 may enable use of multiple antenna techniques for the transmission modes supported in eMBMS, to improve RX SINR and/or downlink throughput maximizing system capacity.

(K) The circuitry 2415 may operate with a signal bandwidth that is extended relative to an existing standard, where the signal bandwidth is extended in integer multiples of a fixed Resource Block (RB) structure to more fully occupy 6/7/8 MHz broadcast channel bandwidths.

In some embodiments, the transmitter is a transmit-only TV transmitter.

In some embodiments, the transmitter is an LTE base station capable of unicast and broadcast transmission.

In some embodiments, the receiver system is part of a mobile device.

In some embodiments, the receiver system is part of a non-mobile device or fixed device (such as a television).

In some embodiments, the receiver system is part of a television or coupled to a television.

Transmitter System for Broadcasting TV Signals

Figure 25:
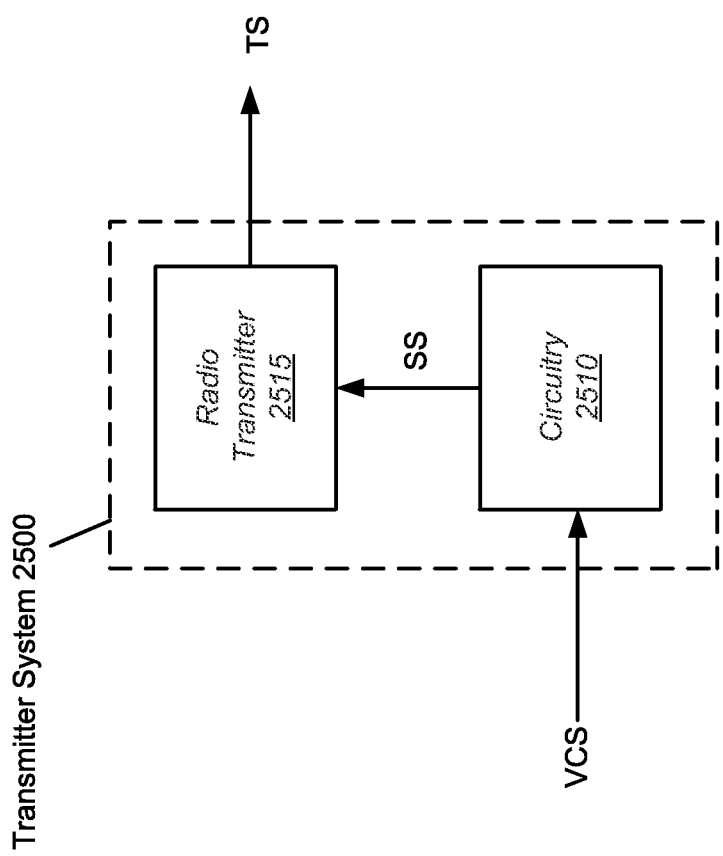
FIG. 25 illustrates one embodiment of a transmitter system for broadcasting TV signals.

In one set of embodiments, a transmitter system 2500 for broadcasting TV signals may include circuitry 2510 and radio transmitter 2515, as shown in FIG. 25. (The transmitter system 2500 may also include any subset of the features, elements and embodiments described above.)

Circuitry 2510 is configured to receive a video content stream VCS and generate a symbol stream SS based on the video content stream. The radio transmitter 2515 configured to generate a transmit signal TS based on the symbol stream, and broadcast the transmit signal into space.

Circuitry 2510 may be configured to support one or more of the features (A) through (K) described below.

(A) Circuitry 2510 may employ multiple candidate cyclic prefix (CP) lengths, to minimize overhead in achieving increased delay spread tolerance, with the MIB/SIB parameter sets extended accordingly;

(B) Circuitry 2510 may employ additional scaling in subcarrier spacing to increase symbol duration for a fixed signal bandwidth, with the MIB/SIB parameter sets extended accordingly;

(C) Circuitry 2510 may employ extended DL and UL control channel signaling to accommodate additional CP lengths;

(D) Circuitry 2510 may extend the DL and UL control channel signaling to accommodate additional range in subcarrier spacing;

(E) Circuitry 2510 may schedule paging and other signaling in the subframes (SFs) that carry primary and secondary sync increasing the number of SFs available for eMBMS, and revise the system configuration advertised on MIB/SIB instructing user devices to accordingly confine their using of paging and other control signaling;

(F) Circuitry 2510 may vary the set of available system parameters (e.g., CP length and subcarrier spacing) as a function of the prescribed eMBMS SF allocation (e.g, permitting use of 6 or 8 (or other) out of 10 SFs per frame while retaining full use of extensibility in system parameters affecting delay spread tolerance);

(G) Circuitry 2510 may employ Hybrid Automatic Repeat reQuest (HARQ) retransmissions in place of bit/symbol interleaving, to improve burst noise immunity without compromising low latency requirements set forth for LTE;

(H) Circuitry 2510 may employ a modified version of HARQ that enables automatic, i.e. prescheduled, retransmission providing incremental redundancy when operating broadcast services in Un-Acknowledged Mode (UAM);

(I) Circuitry 2510 may enable modulation using higher order constellation (than required by an existing standard) for increased maximum system capacity;

(J) Circuitry 2510 may enable use of multiple antenna techniques to the transmission modes supported in eMBMS, to improve RX SINR and/or downlink throughput maximizing system capacity;

(K) Circuitry 2510 may operate with a signal bandwidth that is extended relative to an existing standard, where the signal bandwidth is extended in integer multiples of a fixed Resource Block (RB) structure to more fully occupy 6/7/8 MHz broadcast channel bandwidths.

In some embodiments, the transmitter is a transmit-only TV transmitter.

In some embodiments, the transmitter is an LTE base station capable of unicast and broadcast transmission.

In some embodiments, the transmitter system 2500 may also include a plurality of antennas, wherein the circuitry is configured to generate a plurality of symbol streams based on the video content stream, wherein the radio transmitter is configured to generate transmit signals based respectively on the symbol streams and to transit the transmit signals into space through the respective antennas.

The following numbered paragraphs describe various additional embodiments.

1.1 A spectrum server for allocating available spectrum resources under carrier aggregation, the spectrum server comprising:

one or more processors, and memory storing program instructions, wherein the program instructions, when executed by the one or more processors, cause the one or more processors to perform one or more of the following:

aggregate the available broadcast spectrum into contiguous bands (e.g., to account for the likelihood that a user device, associated with a particular secondary cell, has a limited number of radio receivers to support carrier aggregation);

assign the available spectrum in integer multiples of a fixed resource block (RB) bandwidth, designating the aggregate channel bandwidth according to the channel at the aggregated band center;

employ a channel numbering scheme that accounts for carrier aggregation from either an odd or even number of the available broadcast channels;

employ the two modes, with the first mode being band center oriented (BCO), corresponding to an odd number of aggregated channels, and the second mode being band edge oriented (BEO), corresponding to an even number of aggregated channels;

determine the number of aggregate RBs as a function of the broadcast channel bandwidth (e.g. allocated in multiples of 6, 7 or 8 MHz, depending on the regulatory domain);

number the aggregated spectrum up to an even integer multiple of a fixed RB bandwidth, and allocate the available RBs on either side of the band center frequency to avoid signal power in the DC subcarrier of the DL OFDM signal;

limit the number of RBs available in a given aggregate bandwidth to preserve required band edge spacing, where the number of RBs allocated on either side of the aggregated band center is determined, e.g., by the number of available channels (N) times the signal bandwidth (per regulatory domain) less the spacing required at the band edge divided by the fixed RB bandwidth.

1.2 A base station for use in connection with a method for dynamically aggregating available spectrum resources, the base station comprising: circuitry configured to wirelessly communicate (transmit and/or receive signals) with one or more devices (e.g., mobile devices and/or non-mobile devices) in accordance with a system that performs one or more the following:

aggregates the available broadcast spectrum into contiguous bands (e.g., to account for the likelihood that a user device, associated with a particular secondary cell, has a limited number of radio receivers to support carrier aggregation);

assigns the available spectrum in integer multiples of a fixed resource block (RB) bandwidth, designating the aggregate channel bandwidth according to the channel at the aggregated band center;

employs a channel numbering scheme that accounts for carrier aggregation from either an odd or even number of the available broadcast channels;

employs the two modes, with the first mode being band center oriented (BCO), corresponding to an odd number of aggregated channels, and the second mode being band edge oriented (BEO), corresponding to an even number of aggregated channels;

determines the number of aggregate RBs as a function of the broadcast channel bandwidth (e.g. allocated in multiples of 6, 7 or 8 MHz, depending on the regulatory domain);

numbers the aggregated spectrum up to an even integer multiple of a fixed RB bandwidth, and allocate the available RBs on either side of the band center frequency to avoid signal power in the DC subcarrier of the DL OFDM signal;

limits the number of RBs available in a given aggregate bandwidth to preserve required band edge spacing, where the number of RBs allocated on either side of the aggregated band center is determined, e.g., by the number of available channels (N) times the signal bandwidth (per regulatory domain) less the spacing required at the band edge divided by the fixed RB bandwidth.

1.3 The base station of paragraph 1.2, wherein the circuitry includes one or more RF transceivers, one or more baseband processors, and one or more control processors.

1.4 A device (e.g., a mobile device or non-mobile device) for use in association with a method for dynamically aggregating available spectrum resources, the device comprising: circuitry configured to wirelessly communicate (receive and/or transmit) with one or more base stations in accordance with a system that performs one or more of the following:

aggregates the available broadcast spectrum into contiguous bands (e.g., to account for the likelihood that a user device, associated with a particular secondary cell, has a limited number of radio receivers to support carrier aggregation);

assigns the available spectrum in integer multiples of a fixed resource block (RB) bandwidth, designating the aggregate channel bandwidth according to the channel at the aggregated band center;

employs a channel numbering scheme that accounts for carrier aggregation from either an odd or even number of the available broadcast channels;

employs the two modes, with the first mode being band center oriented (BCO), corresponding to an odd number of aggregated channels, and the second mode being band edge oriented (BEO), corresponding to an even number of aggregated channels;

determines the number of aggregate RBs as a function of the broadcast channel bandwidth (e.g. allocated in multiples of 6, 7 or 8 MHz, depending on the regulatory domain);

numbers the aggregated spectrum up to an even integer multiple of a fixed RB bandwidth, and allocate the available RBs on either side of the band center frequency to avoid signal power in the DC subcarrier of the DL OFDM signal;

limits the number of RBs available in a given aggregate bandwidth to preserve required band edge spacing, where the number of RBs allocated on either side of the aggregated band center is determined, e.g., by the number of available channels (N) times the signal bandwidth (per regulatory domain) less the spacing required at the band edge divided by the fixed RB bandwidth.

1.5 The device of paragraph 1.4, wherein the circuitry includes one or more RF transceivers, one or more baseband processors, and one or more control processors.

2.1. A base station for use as part of a wireless network, the base station comprising:

one or more primary-band (PB) radios, wherein each of the PB radios is configured to transmit at least over a respective one of one or more primary bands (e.g., one or more bands owned by a wireless broadband carrier);

one or more additional radios, wherein each of the one or more additional radios has a carrier frequency that is dynamically tunable to any of multiple frequency bands within the radio spectrum;

a controller configured to:

receive information identifying a first dynamically-allocated spectrum resource;

tune a first of the one or more additional radios to a first carrier frequency corresponding to the first dynamically-allocated spectrum resource;

receive a data stream from an infrastructure network;

divide the data stream into a first set of substreams;

direct a parallel transmission of the substreams of the first set using respectively the one or more PB radios and the first additional radio.

2.1B The base station of paragraph 2.1, wherein each of the PB radios has a carrier frequency that is dynamically tunable to any of the multiple frequency bands.

2.1C The base station of paragraph 2.1, wherein at least one of the PB radios has a carrier frequency that is dynamically tunable to any of the multiple frequency bands.

2.1D The base station of paragraph 2.1, wherein the multiple frequency bands include the one or more primary bands and one or more additional bands.

2.2 The base station of paragraph 2.1, wherein the one or more additional radios comprise a plurality of additional radios, wherein the controller is further configured to:

tune each of the additional radios to a respective carrier frequency corresponding to a respective dynamically-allocated spectrum resource;

divide the data stream into a second set of substreams;

direct the parallel transmission of the substreams of the second set using respectively the one or more PB radios and the additional radios.

2.2B The base station of paragraph 2.1, wherein the controller is further configured to:

receive information identifying a second dynamically-allocated spectrum resource;

tune a second of the additional radios to a second carrier frequency corresponding to the second dynamically-allocated spectrum resource;

divide the data stream into a second set of substreams;

direct the parallel transmission of the substreams of the second set using respectively the one or more PB radios and the first and second additional radios.

2.3 The base station of paragraph 2.1, wherein the information identifying the first dynamically-allocated spectrum resource includes:

information indicating the first carrier frequency of the first dynamically-allocated spectrum resource, and information indicating a first period of time over which the first dynamically-allocated spectrum resource has been allocated to the base station.

2.4 The base station of paragraph 2.1, wherein the controller is configured to generate OFDM symbol streams based respectively on the data substreams, where said parallel transmission includes parallel transmission of the OFDM symbols streams using respectively the one or more PB radios and the first additional radio.

2.5 The base station of paragraph 2.1, wherein the controller is configured to generate symbol streams based respectively on the data substreams, wherein the controller is configured to generate symbols of the symbol streams with a value of cyclic prefix (CP) length that is programmably-selected from a plurality of CP length options.

2.6 The base station of paragraph 2.1, wherein the controller is configured to provide additional scaling in OFDM subcarrier spacing to increase symbol duration for a fixed signal bandwidth (e.g., additional scaling as compared to the scaling already required by an existing wireless communication standard such as LTE).

2.7 The base station of paragraph 2.1, wherein the controller is configured to schedule paging and other signaling in subframes (SFs) that carry primary and secondary sync (e.g., to increase the number of SFs available for eMBMS).

2.7B The base station of paragraph 2.7, wherein the controller is configured use the system configuration advertised on MIB/SIB in order to instruct user devices to confine their use of paging and other control signaling.

2.8 The base station of paragraph 2.1, wherein the controller is configured to vary one or more available system parameters (e.g., parameters such as CP length and subcarrier spacing) as a function of a prescribed eMBMS SF allocation (e.g., permitting the use of 6 or 8 or other out of 10 SFs per frame while retaining full use of extensibility in system parameters affecting delay spread tolerance).

2.9 The base station of paragraph 2.1, wherein the controller is configured to employ Hybrid Automatic Repeat reQuest (HARQ) retransmissions in place of bit interleaving or symbol interleaving (e.g., to improve burst noise immunity without compromising low latency requirements set forth for LTE).

2.10 The base station of paragraph 2.1, wherein the controller is configured to employ a modified version of HARQ, to enable automatic (i.e. prescheduled) retransmission providing incremental redundancy when operating broadcast services in Un-Acknowledged Mode (UAM).

2.11 The base station of paragraph 2.1, wherein the controller is configured to perform modulation using modulation orders that are higher than an existing LTE standard (e.g., 256-QAM over existing 64-QAM) in order to increase maximum system capacity.

2.12 The base station of paragraph 2.1, wherein the controller is configured to employ multiple antenna techniques for one or more or all of the transmission modes supported in eMBMS (e.g., to improve RX SINR and/or downlink throughput, maximizing system capacity).

2.13 The base station of paragraph 2.1, wherein the first dynamically-allocated spectrum resource is specified in terms of one or more resources blocks conforming to a resource block structure of fixed length in the frequency domain.

2.14 The base station of paragraph 2.1, wherein the controller is configured to operate with bandwidth definitions that are extended as compared to existing bandwidth definitions for wireless broadband communication, wherein the extended bandwidth definitions more fully occupy 6/7/8 MHz broadcast channel bandwidths.

3.1 A device for operation as part of a wireless broadband network, the device comprising:

one or more primary-band transceivers, wherein each of the PB transceivers is configured to wirelessly communicate with a base station of the wireless broadband network using a respective one of one or more primary bands within a radio spectrum;

one or more receivers, wherein each of the one or more receivers has a carrier frequency that is dynamically tunable to any of multiple frequency bands within the radio spectrum;

a controller configured to:

receive one or more network data streams from a base station of the wireless broadband network using the one or more PB transceivers;

tune a first of the one or more receivers to a carrier frequency corresponding to a first currently-available spectrum resource of the radio spectrum in response to receiving a first message from the base station, wherein the first message identifies the first currently-available spectrum resource;

receive a first additional network data stream from the base station using the first receiver after having tuned the first receiver; and combine the one or more network data streams and the first additional network data stream to obtain an aggregate data stream.

3.1B The device of paragraph 3.1, wherein the device is a mobile device.

3.1C The device of paragraph 3.1, wherein the device is a fixed device (e.g., a television).

3.2 The device of paragraph 3.1, wherein one or more broadcast transmitters in a geographical neighborhood of the base station are controlled by a broadcast exchange, wherein the broadcast exchange has agreed not to broadcast using the first currently-available spectrum resource in the geographical neighborhood of the base station over a specified period of time.

3.2B The device of paragraph 3.1, wherein one or more broadcast transmitters in a geographical neighborhood of the base station are controlled by an individual broadcaster, wherein the individual broadcaster has agreed not to broadcast using the first currently-available spectrum resource in the geographical neighborhood of the base station over a specified period of time.

3.3 The device of paragraph 3.1, wherein the one or more PB radios and the one or more additional radios each conform to a common hardware design, wherein each of the one or more PB radios is programmed so that it is allowed to operate in the respective primary band.

3.4 The device of paragraph 3.1, wherein the controller is further configured to supply the aggregate data stream to an application executing on the device.

3.5 The device of paragraph 3.1, wherein the multiple frequency bands include at least the VHF band and the UHF band.

3.6 The device of paragraph 3.1, wherein the one or more receivers comprise a plurality of receivers, wherein the controller is further configured to:

tune each of the receivers to a respective carrier frequency corresponding to a respective currently-available spectrum resource in response to receiving a respective message from the base station, wherein the respective message identifies the respective currently-available spectrum resource;

for each of the receivers, receive a respective additional network data stream from the base station using the respective receiver, and combine the one or more network data streams and the additional network data streams to obtain a second aggregate data stream.

3.7 The device of paragraph 3.1, wherein the controller is further configured to: tune a second of the receivers to a carrier frequency corresponding to a second currently-available spectrum resource of the radio spectrum in response to receiving a second message from the base station, wherein the second message identifies the second currently-available spectrum resource; and receive a second additional network data stream from the base station using the second receiver after having tuned the second receiver.

3.8 The device of paragraph 3.1, wherein the first message identifying the first currently-available spectrum resource is received from the base station using at least one of the one or more PB transceivers.

3.9 The device of paragraph 3.1, wherein the first message includes: information indicating the carrier frequency of the first dynamically-allocated spectrum resource, and information indicating of a first period of time over which the first dynamically-allocated spectrum resource has been allocated for use by the mobile station or the base station.

3.10 The device of paragraph 3.1, wherein the controller is configured to extract data from symbols from a symbol stream using a value of cyclic prefix (CP) length that is programmably-selected from a plurality of CP length options, wherein the symbol stream is acquired by the first receiver.

3.11 The device of paragraph 3.1, wherein the controller is configured to provide additional scaling in OFDM subcarrier spacing (e.g., additional scaling as compared to the scaling already required by an existing wireless communication standard such as LTE).

3.12 The device of paragraph 3.1, wherein the controller is configured to vary one or more available system parameters (e.g., parameters such as CP length and subcarrier spacing) as a function of a prescribed eMBMS subframe allocation.

3.13 The device of paragraph 3.1, wherein the controller is configured to employ Hybrid Automatic Repeat reQuest (HARQ) retransmissions in place of bit interleaving or symbol interleaving (e.g., to improve burst noise immunity without compromising low latency requirements set forth for LTE).

3.14 The device of paragraph 3.1, wherein the controller is configured to employ a modified version of HARQ, to enable automatic (i.e. prescheduled) retransmission, providing incremental redundancy when broadcast services are operated in Un-Acknowledged Mode (UAM).

3.15 The device of paragraph 3.1, wherein the controller is configured to perform demodulation using constellation orders that are higher than an existing LTE standard (e.g., 256-QAM over existing 64-QAM) in order to increase maximum system capacity.

3.16 The device of paragraph 3.1, wherein the controller is configured to employ multiple antenna techniques for one or more or all of the transmission modes supported in eMBMS (e.g., to improve RX SINR and/or downlink throughput, maximizing system capacity).

3.17 The device of paragraph 3.1, wherein the first dynamically-allocated spectrum resource is specified in terms of one or more resources blocks conforming to a resource block structure of fixed length in the frequency domain.

3.18 The device of paragraph 3.1, wherein the controller is configured to operate with bandwidth definitions that are extended as compared to existing bandwidth definitions for wireless broadband communication, wherein the extended bandwidth definitions more fully occupy 6/7/8 MHz broadcast channel bandwidths.

3.19 A device for operation as part of a wireless broadband network and for reception of one or more broadcast signals transmitted by a broadcast network including one or more broadcast transmitters, the device comprising:

one or more primary-band transceivers, wherein each of the PB transceivers is configured to wirelessly communicate with a base station of the wireless broadband network using a respective one of one or more primary bands within a radio spectrum;

one or more receivers, wherein each of the one or more receivers has a carrier frequency that is dynamically tunable to any of multiple frequency bands within the radio spectrum;

a controller configured to:

receive one or more network data streams from a base station of the wireless broadband network using the one or more PB transceivers;

tune a first of the one or more receivers to a first broadcast frequency corresponding to a first broadcast signal transmitted by a first of the broadcast transmitters;

in response to said tuning, recover a first broadcast data stream from the first broadcast signal using the first receiver, wherein the first broadcast data stream comprises data that has been off-loaded by the wireless broadcast network to the broadcast network for broadcast via at least one of the one or more broadcast transmitters.

3.19B The device of paragraph 3.19, wherein the device is a mobile device.

3.19C The device of paragraph 3.19, wherein the device is a fixed device (e.g., a television).

3.19D The device of paragraph 3.19, wherein the controller is configured to:

provide the one or more network data streams and the first broadcast data stream to one or more applications executing on the device.

3.20 The device of paragraph 3.19, wherein the controller is further configured to: display a video signal via a display device (e.g., a display device that is incorporated in the device or coupled to the device), wherein the video signal is generated from the first broadcast data stream.

3.21 The device of paragraph 3.19, wherein the broadcast network dynamically controls the allocation of broadcast content streams to spectrum resources for broadcast via the one or more broadcast transmitters.

3.22 The device of paragraph 3.19, wherein the controller is configured to tune the first receiver to the first broadcast frequency in response to user input selecting a particular content item from a displayed content guide.

3.23 The device of paragraph 3.19, wherein the controller is configured to: collect statistics on a user's viewing of content provided via the broadcast transmitters; and transmit the statistics to the wireless network.

3.23B The device of paragraph 3.23, wherein said transmission of the statistics is performed using the one or more PB transceivers.

3.23C The device of paragraph 3.23, wherein said transmission of the statistics is performed using a WiFi transmitter (that is included as part of the device or coupled to the device).

3.23D The device of paragraph 3.23, wherein said transmission of the statistics is performing using a radio configured to transmit over unlicensed radio spectrum.

3.24 The device of paragraph 3.19, wherein the controller is configured to: perform said receiving of the one or more network data streams using OFDM; perform said recovering of the first broadcast data stream using OFDM.

3.25 The device of paragraph 3.19, further comprising any subset of the features described in paragraphs 3.1 through 3.18.

4.1 A method for operating a spectrum server to facilitate the dynamic sale of available spectrum resources to wireless broadband providers, the method comprising:

receiving a request for the purchase of a spectrum resource, wherein the request is received from a wireless broadband provider (e.g., via a computer network);

accessing memory to obtain information identifying a particular spectrum resource in a list of spectrum resources that are not currently being used by a broadcast network, wherein the broadcast network dynamically controls the allocation of broadcast content streams to spectrum resources for transmission via a plurality of broadcast transmitters;

receiving payment or the promise of payment from the wireless broadband provider;

transmitting (e.g., via the computer network) information authorizing the wireless broadband provider to use the particular spectrum resource.

4.2. The method of paragraph 4.1, further comprising: removing the particular spectrum resource from the list in response to said receiving payment or promise of payment.

4.3. The method of paragraph 4.1, wherein, for each of the spectrum resources on the list, the list includes an indication of a period of time over which the broadcast network agrees not to use the spectrum resource.

4.4. The method of paragraph 4.1, wherein, for each of the spectrum resources on the list, the list includes an indication of a geographical location of one of the broadcast transmitters through which the broadcast network agrees not to transmit on the spectrum resource.

4.5. The method of paragraph 4.1, further comprising: purchasing a block of available spectrum resources from the broadcast network; and adding the available spectrum resources to the list.

4.6. The method of paragraph 4.1, wherein, in response to said transmitting authorizing information, the wireless broadband provider is configured to instruct one or more base stations to start transmitting wirelessly on the particular spectrum resource.

4.7 The method of paragraph 4.1, wherein the spectrum server is configured to perform one or more of the following:

aggregate the available broadcast spectrum into contiguous bands (e.g., to account for the likelihood that a user device, associated with a particular secondary cell, has a limited number of radio receivers to support carrier aggregation);

assign the available spectrum in integer multiples of a fixed resource block (RB) bandwidth, designating the aggregate channel bandwidth according to the channel at the aggregated band center;

employ a channel numbering scheme that accounts for carrier aggregation from either an odd or even number of the available broadcast channels;

employ the two modes, with the first mode being band center oriented (BCO), corresponding to an odd number of aggregated channels, and the second mode being band edge oriented (BEO), corresponding to an even number of aggregated channels;

determine the number of aggregate RBs as a function of the broadcast channel bandwidth (e.g. allocated in multiples of 6, 7 or 8 MHz, depending on the regulatory domain);

number the aggregated spectrum up to an even integer multiple of a fixed RB bandwidth, and allocate the available RBs on either side of the band center frequency to avoid signal power in the DC subcarrier of the DL OFDM signal;

limit the number of RBs available in a given aggregate bandwidth to preserve required band edge spacing, where the number of RBs allocated on either side of the aggregated band center is determined, e.g., by the number of available channels (N) times the signal bandwidth (per regulatory domain) less the spacing required at the band edge divided by the fixed RB bandwidth.

4.8 A method for operating a server as part of a wireless broadband network, to facilitate the dynamic purchase of spectrum resources, wherein base stations of the wireless broadband network operate in the same geographical region as a broadcast network including a set of broadcast transmitters, the method comprising:

receiving a first message indicating that a given one of the base stations in the wireless network currently needs additional bandwidth;

in response to the first message, sending a request to a broadcast server for purchase of a currently-available spectrum resource in a geographical neighborhood of the given base station;

receiving from the broadcast server a second message identifying a particular currently-available spectrum resource, wherein the broadcast network has agreed that it will not transmit using the particular currently-available spectrum resource within the geographical neighborhood of the given base station.

4.8B The method of paragraph 4.8, further comprising:

sending information indicating payment or a promise of payment to the broadcast server for use of the particular currently-available spectrum resource.

4.9 The method of paragraph 4.8, further comprising:

sending a third message to the given base station, wherein the third message identifies the particular currently-available spectrum resource and enables the given base station to start transmitting using the particular currently-available spectrum resource.

4.10 The method of paragraph 4.8, wherein the first message is received from a load control server that monitors the state of loading of base stations with the broadband wireless network.

4.11 The method of paragraph 4.8, wherein the request sent to a broadcast server includes an indication of the location of the given base station.

4.12 The method of paragraph 4.8, wherein the second message received from the broadcast server includes:

information indicating a frequency range occupied by the particular currently-available spectrum resource; and information indicating a time period over which the broadcast network has agreed not to transmit within the geographical neighborhood of the given base station.

5.1 A method for operating an advertising server as part of a wireless network, to provide targeted advertising to a device that is configured for communication with a wireless network and for reception from broadcast transmitters of a broadcast network, the method comprising:

receiving viewing information from the device, wherein the viewing information characterizes behavior of a user of the device in viewing broadcast content through one or more of the broadcast transmitters;

adding the viewing information to a user-specific record stored in a memory medium;

selecting advertising for the user of the device based on a current state of the user-specific record;

transmitting a content stream corresponding to the selected advertising to the device via a currently-serving base station of the wireless network.

5.1B The method of paragraph 5.1, wherein the device is a mobile device.

5.1C The method of paragraph 5.1, wherein the device is non-mobile (e.g., a television).

5.1B The method of paragraph 5.1, wherein the device transmits the viewing information to the advertising server using a currently-serving base station of the wireless network.

5.1C The method of paragraph 5.1, wherein the device transmits the viewing information to the advertising server using a WiFi connection between the device and a WiFi access point.

5.1D The method 5.1, wherein the device transmits the viewing information to the advertising server using a transmission over unlicensed spectrum (e.g., WiFi or white space).

5.2 The method of paragraph 5.1, wherein the viewing information includes one or more of:

an indication of a broadcast content item currently being viewed by the user of the device;

a title of a broadcast content item currently being viewed by the user of the device;

a duration of viewing of a broadcast content item that has been broadcast by the broadcast network;

a list of broadcast content items viewed by the user of the device.

5.3 The method of paragraph 5.1, wherein the user-specific record includes descriptive information (e.g., age, sex, categories of interest, educational background, income range, etc.) corresponding to the user of the device.

5.4 The method of paragraph 5.1, wherein said selecting of advertising for the user is based on a predetermined optimal mapping between user characterizing information and advertising content items.

5.5 The method of paragraph 5.1, further comprising:

receiving a request for purchase of user-specific viewing information via a network (e.g., the Internet);

transmitting data from one or more of the user-specific records stored in the memory medium to the requesting entity;

receiving payment or promise of payment from the requesting entity for purchase of the user-specific viewing information.

5.6 The method of paragraph 5.1, further comprising:

receiving a request for purchase of right to advertise to the user of the device (e.g., from an entity that has previously purchased user-specific viewing information, and concluded that it would be worth advertising directly to the user);

receiving payment or promise of payment from the requesting entity for purchase of the right to advertise;

receiving an advertising content stream from the requesting entity; and transmitting the advertising content stream to the device via the currently-serving base station of the wireless network.

6.1 A receiver system for receiving broadcast TV signals, the receiver comprising:

a radio receiver that is tunable to any of multiple frequency bands, wherein the radio receiver is configured to receive a broadcast signal that is broadcasted by a transmitter; and circuitry configured to recover a video data stream from the received broadcast signal, wherein the circuitry is configured to support one or more of the following features:

extract data from OFDM symbols using a cyclic prefix (CP) length that is selected from multiple candidate CP lengths, to minimize overhead in achieving increased delay spread tolerance, where the CP length is signaled by the base station using extended MIB/SIB parameter sets;

employ additional scaling in subcarrier spacing to increase symbol duration for a fixed signal bandwidth, where the additional scaling is signaled by the base station using extended MIB/SIB parameter sets;

respond to extended DL and UL control channel signaling to accommodate additional CP lengths;

respond to extended DL and UL control channel signaling to accommodate additional range in subcarrier spacing;

monitor paging and other signaling in the subframes (SFs) that carry primary and secondary sync in response to a revised system configuration advertised by the base station on the MIB/SIB, wherein the revised system configuration instructs user devices to confine their use of paging and other control signaling to said subframes, thus increasing the number of SFs available for eMBMS;

determine the set of available system parameters (e.g., CP length and subcarrier spacing) based on the prescribed eMBMS SF allocation as signaled by the base station;

accept Hybrid Automatic Repeat reQuest (HARQ) retransmissions in place of bit/symbol interleaving to improve burst noise immunity without compromising low latency requirements set forth for LTE;

accept automatic (i.e. prescheduled) retransmission, providing incremental redundancy when operating broadcast services in Un-Acknowledged Mode (UAM);

enable demodulation using higher order constellation (than required by an existing standard) for increased maximum system capacity;

enable use of multiple antenna techniques for the transmission modes supported in eMBMS, to improve RX SINR and/or downlink throughput maximizing system capacity;

operate with a signal bandwidth that is extended relative to an existing standard, where the signal bandwidth is extended in integer multiples of a fixed Resource Block (RB) structure to more fully occupy 6/7/8 MHz broadcast channel bandwidths.

6.1B The receiver system of paragraph 6.1, wherein the transmitter is a transmit-only TV transmitter.

6.1C The receiver system of paragraph 6.1, wherein the transmitter is an LTE base station capable of unicast and broadcast transmission.

6.2 The receiver system of paragraph 6.1, wherein the receiver system is part of a mobile device.

6.3 The receiver system of paragraph 6.1, wherein the receiver system is part of a non-mobile device or fixed device (such as a television).

6.3 The receiver system of paragraph 6.2, wherein the receiver system is part of a television or coupled to a television.

6.4 A receiver system for receiving broadcast TV signals, the receiver comprising:

a radio receiver that is tunable to any of multiple frequency bands, wherein the radio receiver is configured to receive a broadcast signal that is broadcasted by a transmitter; and circuitry configured to recover a video data stream from the received broadcast signal, wherein the digital circuitry is configured to extract data from OFDM symbols using a cyclic prefix (CP) length that is selected from multiple candidate CP lengths, to minimize overhead in achieving increased delay spread tolerance, where the CP length is signaled by the base station using extended MIB/SIB parameter sets.

6.5 A receiver system for receiving broadcast TV signals, the receiver comprising:

a radio receiver that is tunable to any of multiple frequency bands, wherein the radio receiver is configured to receive a broadcast signal that is broadcasted by a transmitter; and circuitry configured to recover a video data stream from the received broadcast signal, wherein the digital circuitry is configured to employ additional scaling in subcarrier spacing to increase symbol duration for a fixed signal bandwidth, where the additional scaling is signaled by the base station using extended MIB/SIB parameter sets.

6.6 A receiver system for receiving broadcast TV signals, the receiver comprising:

a radio receiver that is tunable to any of multiple frequency bands, wherein the radio receiver is configured to receive a broadcast signal that is broadcasted by a transmitter; and circuitry configured to recover a video data stream from the received broadcast signal, wherein the digital circuitry is configured to monitor paging and other signaling in the subframes (SFs) that carry primary and secondary sync in response to a revised system configuration advertised by the base station on the MIB/SIB, wherein the revised system configuration instructs user devices to confine their use of paging and other control signaling to said subframes, thus increasing the number of SFs available for eMBMS.

6.7 A receiver system for receiving broadcast TV signals, the receiver comprising:

a radio receiver that is tunable to any of multiple frequency bands, wherein the radio receiver is configured to receive a broadcast signal that is broadcasted by a transmitter; and circuitry configured to recover a video data stream from the received broadcast signal, wherein the digital circuitry is configured to determine the set of available system parameters (e.g., CP length and subcarrier spacing) based on the prescribed eMBMS SF allocation as signaled by the base station.

6.8 A receiver system for receiving broadcast TV signals, the receiver comprising:

a radio receiver that is tunable to any of multiple frequency bands, wherein the radio receiver is configured to receive a broadcast signal that is broadcasted by a transmitter; and circuitry configured to recover a video data stream from the received broadcast signal, wherein the digital circuitry is configured to accept Hybrid Automatic Repeat reQuest (HARQ) retransmissions in place of bit/symbol interleaving to improve burst noise immunity without compromising low latency requirements set forth for LTE.

6.9 A receiver system for receiving broadcast TV signals, the receiver comprising:

a radio receiver that is tunable to any of multiple frequency bands, wherein the radio receiver is configured to receive a broadcast signal that is broadcasted by a transmitter; and circuitry configured to recover a video data stream from the received broadcast signal, wherein the digital circuitry is configured to accept automatic (i.e. prescheduled) retransmission, providing incremental redundancy when operating broadcast services in Un-Acknowledged Mode (UAM).

6.10 A receiver system for receiving broadcast TV signals, the receiver comprising:

a radio receiver that is tunable to any of multiple frequency bands, wherein the radio receiver is configured to receive a broadcast signal that is broadcasted by a transmitter; and circuitry configured to recover a video data stream from the received broadcast signal, wherein the digital circuitry is configured to enable demodulation using higher order constellation (than required by an existing standard) for increased maximum system capacity.

6.11 A receiver system for receiving broadcast TV signals, the receiver comprising:

a radio receiver that is tunable to any of multiple frequency bands, wherein the radio receiver is configured to receive a broadcast signal that is broadcasted by a transmitter; and circuitry configured to recover a video data stream from the received broadcast signal, wherein the digital circuitry is configured to enable use of multiple antenna techniques for the transmission modes supported in eMBMS, to improve RX SINR and/or downlink throughput maximizing system capacity.

6.12 A receiver system for receiving broadcast TV signals, the receiver comprising:

a radio receiver that is tunable to any of multiple frequency bands, wherein the radio receiver is configured to receive a broadcast signal that is broadcasted by a transmitter; and circuitry configured to recover a video data stream from the received broadcast signal, wherein the digital circuitry is configured to operate with a signal bandwidth that is extended relative to an existing standard, where the signal bandwidth is extended in integer multiples of a fixed Resource Block (RB) structure to more fully occupy 6/7/8 MHz broadcast channel bandwidths.

7.1 A transmitter system for broadcasting TV signals, the transmitter comprising:

circuitry configured to receive a video content stream and generate a symbol stream based on the video content stream; and a radio transmitter configured to generate a transmit signal based on the symbol stream, and broadcast the transmit signal into space;

wherein the circuitry is configured to support one or more of the following features:

employ multiple candidate cylic prefix (CP) lengths, to minimize overhead in achieving increased delay spread tolerance, with the MIB/SIB parameter sets extended accordingly;

employ additional scaling in subcarrier spacing to increase symbol duration for a fixed signal bandwidth, with the MIB/SIB parameter sets extended accordingly;

employ extended DL and UL control channel signaling to accommodate additional CP lengths;

extend the DL and UL control channel signaling to accommodate additional range in subcarrier spacing;

schedule paging and other signaling in the subframes (SFs) that carry primary and secondary sync increasing the number of SFs available for eMBMS, and revise the system configuration advertised on MIB/SIB instructing user devices to accordingly confine their using of paging and other control signaling;

vary the set of available system parameters (e.g., CP length and subcarrier spacing) as a function of the prescribed eMBMS SF allocation (e.g, permitting use of 6 or 8 (or other) out of 10 SFs per frame while retaining full use of extensibility in system parameters affecting delay spread tolerance);

employ Hybrid Automatic Repeat reQuest (HARQ) retransmissions in place of bit/symbol interleaving, to improve burst noise immunity without compromising low latency requirements set forth for LTE;

employ a modified version of HARQ that enables automatic, i.e. prescheduled, retransmission providing incremental redundancy when operating broadcast services in Un-Acknowledged Mode (UAM);

enable modulation using higher order constellation (than required by an existing standard) for increased maximum system capacity;

enable use of multiple antenna techniques to the transmission modes supported in eMBMS, to improve RX SINR and/or downlink throughput maximizing system capacity;

operate with a signal bandwidth that is extended relative to an existing standard, where the signal bandwidth is extended in integer multiples of a fixed Resource Block (RB) structure to more fully occupy 6/7/8 MHz broadcast channel bandwidths.

7.1B The transmitter system of paragraph 7.1, wherein the transmitter is a transmit-only TV transmitter.

7.1C The transmitter system of paragraph 7.1, wherein the transmitter is an LTE base station capable of unicast and broadcast transmission.

7.2 The transmitter system of paragraph 7.1, further comprising:

a plurality of antennas, wherein the circuitry is configured to generate a plurality of symbol streams based on the video content stream, wherein the radio transmitter is configured to generate transmit signals based respectively on the symbol streams and to transit the transmit signals into space through the respective antennas.

7.3 A transmitter system for broadcasting TV signals, the transmitter comprising:

circuitry configured to receive a video content stream and generate a symbol stream based on the video content stream; and a radio transmitter configured to generate a transmit signal based on the symbol stream, and broadcast the transmit signal into space;

wherein the circuitry is configured to employ multiple candidate cylic prefix (CP) lengths, to minimize overhead in achieving increased delay spread tolerance, with the MIB/SIB parameter sets extended accordingly.

7.4 A transmitter system for broadcasting TV signals, the transmitter comprising:

circuitry configured to receive a video content stream and generate a symbol stream based on the video content stream; and a radio transmitter configured to generate a transmit signal based on the symbol stream, and broadcast the transmit signal into space;

wherein the circuitry is configured to employ additional scaling in subcarrier spacing to increase symbol duration for a fixed signal bandwidth, with the MIB/SIB parameter sets extended accordingly.

7.5 A transmitter system for broadcasting TV signals, the transmitter comprising:

circuitry configured to receive a video content stream and generate a symbol stream based on the video content stream; and a radio transmitter configured to generate a transmit signal based on the symbol stream, and broadcast the transmit signal into space;

wherein the circuitry is configured to schedule paging and other signaling in the subframes (SFs) that carry primary and secondary sync increasing the number of SFs available for eMBMS, and revise the system configuration advertised on MIB/SIB instructing user devices to accordingly confine their using of paging and other control signaling.

7.6 A transmitter system for broadcasting TV signals, the transmitter comprising:

circuitry configured to receive a video content stream and generate a symbol stream based on the video content stream; and a radio transmitter configured to generate a transmit signal based on the symbol stream, and broadcast the transmit signal into space;

wherein the circuitry is configured to vary the set of available system parameters (e.g., CP length and subcarrier spacing) as a function of the prescribed eMBMS SF allocation (e.g, permitting use of 6 or 8 (or other) out of 10 SFs per frame while retaining full use of extensibility in system parameters affecting delay spread tolerance).

7.7 A transmitter system for broadcasting TV signals, the transmitter comprising:
circuitry configured to receive a video content stream and generate a symbol stream based on the video content stream; and
a radio transmitter configured to generate a transmit signal based on the symbol stream, and broadcast the transmit signal into space;
wherein the circuitry is configured to employ Hybrid Automatic Repeat reQuest (HARQ) retransmissions in place of bit/symbol interleaving, to improve burst noise immunity without compromising low latency requirements set forth for LTE.

7.8 A transmitter system for broadcasting TV signals, the transmitter comprising:
circuitry configured to receive a video content stream and generate a symbol stream based on the video content stream; and
a radio transmitter configured to generate a transmit signal based on the symbol stream, and broadcast the transmit signal into space;
wherein the circuitry is configured to employ a modified version of HARQ that enables automatic, i.e. prescheduled, retransmission providing incremental redundancy when operating broadcast services in Un-Acknowledged Mode (UAM).

7.9 A transmitter system for broadcasting TV signals, the transmitter comprising:
circuitry configured to receive a video content stream and generate a symbol stream based on the video content stream; and
a radio transmitter configured to generate a transmit signal based on the symbol stream, and broadcast the transmit signal into space;
wherein the circuitry is configured to enable modulation using higher order constellation (than required by an existing standard) for increased maximum system capacity.

7.10 A transmitter system for broadcasting TV signals, the transmitter comprising:
circuitry configured to receive a video content stream and generate a symbol stream based on the video content stream; and
a radio transmitter configured to generate a transmit signal based on the symbol stream, and broadcast the transmit signal into space;
wherein the circuitry is configured to enable use of multiple antenna techniques to the transmission modes supported in eMBMS, to improve RX SINR and/or downlink throughput maximizing system capacity.

7.11 A transmitter system for broadcasting TV signals, the transmitter comprising:
circuitry configured to receive a video content stream and generate a symbol stream based on the video content stream; and
a radio transmitter configured to generate a transmit signal based on the symbol stream, and broadcast the transmit signal into space; wherein the circuitry is configured to operate with a signal bandwidth that is extended relative to an existing standard, where the signal bandwidth is extended in integer multiples of a fixed Resource Block (RB) structure to more fully occupy 6/7/8 MHz broadcast channel bandwidths.

Any of the various embodiments described herein may be realized in any of various forms, e.g., as a computer-implemented method, as a computer-readable memory medium, as a computer system, etc. A system may be realized by one or more custom-designed hardware devices such as Application Specific Integrated Circuits (ASICs), by one or more programmable hardware elements such as Field Programmable Gate Arrays (FPGAs), by one or more processors executing stored program instructions, or by any combination of the foregoing.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a mobile device, a wearable computer, a sensing device, a television, a video acquisition device, a computer embedded in a living organism, etc. The computer system may include one or more display devices. Any of the various computational results disclosed herein may be displayed via a display device or otherwise presented as output via a user interface device.

Although the above embodiments have been described in connection with the preferred embodiment, it is not intended to be limited to the specific form set forth herein, but on the contrary, it is intended to cover such alternatives, modifications, and equivalents, as can be reasonably included within the spirit and scope of the embodiments of the invention as defined by the appended claims.

What is claimed is:
1. A spectrum server for allocating available broadcast spectrum resources under carrier aggregation, the spectrum server comprising:
one or more processors, and
a memory storing program instructions that when executed by the one or more processors, cause the one or more processors to perform operations including:
querying a broadcast exchange server representing one or more broadcast networks for information indicative of available broadcast spectrum;
in response to said querying, receiving the information indicative of the available broadcast spectrum from the broadcast exchange server, wherein, for each of a plurality of frequency bands in a regulatory domain, the information indicates available or non-available status of each channel in a set of channels corresponding to the frequency band;
combining a contiguous group of the channels that are of available status, to form a contiguous band;
assigning a contiguous portion of the contiguous band to a wireless broadband network in response to a request from an entity representing the wireless broadband network, wherein said assigned contiguous portion is defined by an interval of resource block numbers, wherein the resource block numbers correspond to a partition of the contiguous band into resource blocks of fixed width, wherein the resource block numbers are consecutively numbered, in order of frequency; and transmitting a message to the entity representing the wireless broadband network, wherein the message identifies the interval of resource block numbers by its endpoints, wherein the message also indicates a period of time that said contiguous portion is assigned.

2. The spectrum server of claim 1, wherein the resource blocks of said partition are distributed symmetrically with respect to a center of the contiguous band.

3. The spectrum server of claim 1, wherein the information also indicates a time period over which the one or more broadcast networks have agreed not to transmit on said available broadcast spectrum.

4. The spectrum server of claim 1, wherein the information also indicates a time period over which the one or more broadcast networks have agreed to not transmit using said available broadcast spectrum in some geographical region.

5. The spectrum server of claim 1, wherein said one or more broadcast networks include a television broadcast network.

6. The spectrum server of claim 5, wherein said wireless broadband network is a Long Term Evolution (LTE) network.

7. The spectrum server of claim 1, wherein, in response to determining that a number of the resource blocks included in the contiguous portion is odd, the one or more processors are configured to insert a half-subcarrier shift of the resource blocks included in the contiguous portion, wherein said insertion avoids signal power being allocated to a DC subcarrier when the wireless broadband network generates a downlink signal based on said contiguous portion.

8. The spectrum server of claim 1, wherein the resource blocks of said partition exclude edge portions of the contiguous band, to avoid interference with transmissions on other bands of radio spectrum.

9. The spectrum server of claim 1, wherein the program instructions, when executed by the one or more processors, cause the one or more processors to store a list of the channels that are of available status, wherein, for each of the available channels, the list includes a period of time over which a corresponding one of the one or more broadcast networks agrees not to use the available channel.

10. The spectrum server of claim 1, wherein the program instructions, when executed by the one or more processors, cause the one or more processors to receive a message relating to a payment for use of the contiguous portion, wherein the message is received from said entity representing the wireless broadband network.

11. The spectrum server of claim 1, wherein the entity is a base station, wherein the program instructions, when executed by the one or more processors, cause the one or more processors to determine a level of carrier aggregation (CA) support of the base station, wherein said determining is performed in response to registration of the base station with the spectrum server.

12. The spectrum server of claim 1, wherein the program instructions, when executed by the one or more processors, cause the one or more processors to allocate resource blocks corresponding to the contiguous portion on either side of a center of the contiguous band, to avoid the possibility of signal power in a DC subcarrier.

13. The spectrum server of claim 1,
wherein the set of channels corresponding to a first of the frequency bands has a different number of channels than the set of channels corresponding to a second of the frequency bands,
wherein the resource blocks of said partition of the contiguous band are distributed symmetrically with respect to a center of the contiguous band,
wherein the program instructions, when executed by the one or more processors, cause the one or more processors to assign a second portion of the contiguous band to a second wireless broadband network, wherein the second wireless broadband network belongs to a different wireless carrier than said wireless broadband network.

14. A base station for operation as part of a wireless broadband network, enabling dynamic aggregation of spectrum resources, the base station comprising:
circuitry configured to wirelessly transmit a downlink signal to one or more devices using aggregated spectrum resources including a portion of broadband spectrum and a contiguous portion of broadcast spectrum;
wherein the contiguous portion of broadcast spectrum has been made available by one or more broadcast networks and dynamically assigned to the wireless broadband network by a spectrum server in response to a query of a broadcast exchange server representing the one or more broadcast networks by the spectrum server and based on information that is indicative of available broadcast spectrum received from the broadcast exchange server,
wherein, for each of a plurality of frequency bands in a regulatory domain, the information indicates available or non-available status of each channel in a set of channels corresponding to the frequency band,
wherein the contiguous portion has been assigned by the spectrum server from a contiguous band, which has been formed, by the spectrum server, from a contiguous group of channels of available status,
wherein the contiguous portion of the contiguous band is specified by the spectrum server as an interval of resource block numbers according to a partition of the contiguous band into resource blocks of fixed width;
wherein the resource block numbers are consecutively numbered, in order of frequency,
wherein the circuitry is configured to receive a message from the spectrum server, wherein the message identifies the interval by its endpoints, wherein the message also indicates a period of time that said contiguous portion is assigned.

15. The base station of claim 14, wherein, if a number of resource blocks defining said contiguous portion is odd, said circuitry is configured to insert a half-subcarrier shift of those one or more resource blocks defining said contiguous portion, wherein said insertion avoids signal power being allocated to a DC subcarrier.

16. The base station of claim 14, wherein the resource blocks of said partition of the contiguous band exclude edge portions of the contiguous band, to avoid interference with transmissions on other bands of radio spectrum.

17. The base station of claim 14, wherein the circuitry includes one or more RF transceivers, one or more baseband processors, and one or more control processors.

18. A device enabling dynamic aggregation of spectrum resources, the device comprising:

circuitry configured to wirelessly communicate with one or more base stations associated with a wireless broadband network, wherein said communication includes receiving a downlink signal transmitted by a first of the one or more base stations, wherein the downlink signal uses aggregated spectrum resources including a contiguous portion of broadcast spectrum, wherein the contiguous portion of broadcast spectrum has been made available by one or more broadcast networks and dynamically assigned to the wireless broadband network by a spectrum server in response to a query of a broadcast exchange server representing the one or more broadcast networks by the spectrum server and based on information that is indicative of available broadcast spectrum received from the broadcast exchange server, wherein, for each of a plurality of frequency bands in a regulatory domain, the information indicates available or non-available status of each channel in a set of channels corresponding to the frequency band, wherein the contiguous portion has been assigned by the spectrum server from a contiguous band, which has been formed, by the spectrum server, from a contiguous group of channels of available status, wherein the contiguous portion of the contiguous band is specified by the spectrum server as an interval of resource block numbers according to a partition of the contiguous band into resource blocks of fixed width, wherein the resource block numbers are consecutively numbered, in order of frequency, wherein the interval is identified by its endpoints.

19. The device of claim 18, wherein the circuitry includes one or more RF transceivers, one or more baseband processors, and one or more control processors.

* * * * *